US007451849B1

(12) United States Patent
Zuberi et al.

(10) Patent No.: US 7,451,849 B1
(45) Date of Patent: Nov. 18, 2008

(54) SUBSTANTIALLY FIBROUS EXHAUST SCREENING SYSTEM FOR MOTOR VEHICLES

(75) Inventors: Bilal Zuberi, Cambridge, MA (US); Robert G. Lachenauer, Weston, MA (US)

(73) Assignee: GEO2 Technologies, Inc., Woburn, MA (US)

( * ) Notice: Subject to any disclaimer, the term of this patent is extended or adjusted under 35 U.S.C. 154(b) by 252 days.

(21) Appl. No.: 11/164,002

(22) Filed: Nov. 7, 2005

(51) Int. Cl.
*B62D 63/00* (2006.01)
*F01N 3/08* (2006.01)
*F01N 3/10* (2006.01)
(52) U.S. Cl. .................. 180/218; 180/313; 60/272; 60/273; 60/274; 60/282; 60/299; 60/302
(58) Field of Classification Search .................. 180/218, 180/313; 60/272, 273, 274, 282, 299, 302
See application file for complete search history.

(56) References Cited

U.S. PATENT DOCUMENTS

| | | |
|---|---|---|
| 1,924,472 A | 8/1933 | Miller |
| 2,120,133 A | 6/1938 | Kohler |
| 2,390,262 A | 12/1945 | Mazer |
| 2,847,314 A | 8/1958 | Fisher |
| 2,930,407 A | 3/1960 | Conley |
| 3,077,413 A | 2/1963 | Campbell |
| 3,090,094 A | 5/1963 | Schwartzwalder |
| 3,094,394 A | 6/1963 | Innes |
| 3,112,184 A | 11/1963 | Hollenbach |
| 3,141,206 A | 7/1964 | Stephens |
| 3,159,235 A | 12/1964 | Young |
| 3,311,481 A | 3/1967 | Sterry |
| 3,549,473 A | 12/1970 | LeBlanc |
| 3,702,279 A | 11/1972 | Ardary |
| 3,752,683 A | 8/1973 | Hawthorne |
| 3,788,935 A | 1/1974 | Shyne |
| 3,795,524 A | 3/1974 | Sowman |
| 3,827,238 A | 8/1974 | Hayashi |
| 3,869,267 A | 3/1975 | Gaylor |
| 3,916,057 A | 10/1975 | Hatch |
| 3,920,404 A | 11/1975 | Gandhi |
| 3,927,152 A | 12/1975 | Kyrias |
| 3,935,060 A | 1/1976 | Blome |
| 3,945,803 A | 3/1976 | Musall |
| 3,952,083 A | 4/1976 | Fletcher |
| 3,953,646 A | 4/1976 | Fletcher |
| 3,957,445 A | 5/1976 | Foster |
| 3,969,095 A | 7/1976 | Kurahashi |
| 3,978,567 A | 9/1976 | Vroman |
| 4,001,996 A | 1/1977 | Byrd, Jr. |
| 4,004,649 A | 1/1977 | Shimada |
| 4,007,539 A | 2/1977 | Nishio |
| 4,012,485 A | 3/1977 | Meguerian |
| 4,014,372 A | 3/1977 | Dichiara |
| 4,020,896 A | 5/1977 | Mold |
| 4,038,175 A | 7/1977 | Bhasin |
| 4,039,292 A | 8/1977 | Morini |
| 4,041,199 A | 8/1977 | Cartwright |
| 4,041,592 A | 8/1977 | Kelm |
| 4,056,654 A | 11/1977 | Kompanek |
| 4,065,046 A | 12/1977 | Roberts |
| 4,092,194 A | 5/1978 | Green |
| 4,094,644 A | 6/1978 | Wagner |
| 4,094,645 A | 6/1978 | Bailey |
| 4,098,580 A | 7/1978 | Shimizu |
| 4,148,962 A | 4/1979 | Frosch |
| 4,156,533 A | 5/1979 | Close |
| 4,192,402 A | 3/1980 | Nakagawa |
| 4,206,177 A | 6/1980 | Otsubo |
| 4,208,374 A | 6/1980 | Foster |
| 4,239,733 A | 12/1980 | Foster |
| 4,276,071 A | 6/1981 | Outland |
| 4,290,501 A | 9/1981 | Tanaka |
| 4,297,328 A | 10/1981 | Ritscher |
| 4,319,556 A | 3/1982 | Schwartz |
| 4,324,572 A | 4/1982 | Erdmannsdorfer |
| 4,329,162 A | 5/1982 | Pitcher, Jr. |
| 4,335,023 A | 6/1982 | Dettling |
| 4,338,368 A | 7/1982 | Lovelace |
| 4,343,074 A | 8/1982 | Bailey |
| 4,345,430 A | 8/1982 | Pallo |
| 4,348,362 A | 9/1982 | Foss |
| 4,349,055 A | 9/1982 | Dichiara |
| 4,358,480 A | 11/1982 | Ecord |
| 4,379,109 A | 4/1983 | Simpson |

(Continued)

FOREIGN PATENT DOCUMENTS

EP   0044716   1/1982

(Continued)

OTHER PUBLICATIONS

Ogunwumi et al., Aluminum Titanate Compositions for Diesel Particulate Filters, SAE Technical Paper Series 2005-01-0583, Apr. 2005.

(Continued)

*Primary Examiner*—Timothy C Vanoy

(57) ABSTRACT

An exhaust gas pollution treatment device, having an inlet pipe, an outlet pipe with an exhaust path extending between the inlet pipe and the outlet pipe. A gas permeable backbone member is positioned in the exhaust path and a substantially fibrous nonwoven refractory material is disposed on the backbone.

20 Claims, 10 Drawing Sheets

U.S. PATENT DOCUMENTS

| | | |
|---|---|---|
| 4,398,931 A | 8/1983 | Shevlin |
| 4,404,992 A | 9/1983 | Sasaki |
| 4,410,427 A | 10/1983 | Wydeven |
| 4,415,342 A | 11/1983 | Foss |
| 4,417,908 A | 11/1983 | Pitcher, Jr. |
| 4,427,418 A | 1/1984 | Kogiso |
| 4,456,457 A | 6/1984 | Nozawa |
| 4,457,895 A | 7/1984 | Prigent |
| 4,483,108 A | 11/1984 | Howard |
| 4,495,399 A | 1/1985 | Cann |
| 4,508,256 A | 4/1985 | Radel |
| 4,529,718 A | 7/1985 | Dupin |
| 4,550,034 A | 10/1985 | Shimrock |
| 4,554,195 A | 11/1985 | Ormiston |
| 4,557,773 A | 12/1985 | Bonzo |
| 4,584,003 A | 4/1986 | Oda |
| 4,601,868 A | 7/1986 | Radel |
| 4,608,108 A | 8/1986 | Goll |
| 4,609,563 A | 9/1986 | Shimrock |
| 4,647,477 A | 3/1987 | DeLuca |
| 4,650,775 A | 3/1987 | Hill |
| 4,671,911 A | 6/1987 | Garnier |
| 4,682,470 A | 7/1987 | Shaff |
| 4,686,128 A | 8/1987 | Gentilman |
| 4,696,711 A | 9/1987 | Greszczuk |
| 4,710,487 A | 12/1987 | Koch |
| 4,711,009 A | 12/1987 | Cornelison |
| 4,722,920 A | 2/1988 | Kimura |
| 4,732,593 A | 3/1988 | Kondo |
| 4,732,879 A | 3/1988 | Kalinowski |
| 4,735,756 A | 4/1988 | Rausch |
| 4,737,326 A | 4/1988 | Wirth |
| 4,749,674 A | 6/1988 | Dejaifve et al. |
| 4,761,323 A | 8/1988 | Muhlratzer |
| 4,818,625 A | 4/1989 | Lavendel |
| 4,828,774 A | 5/1989 | Andersson |
| 4,847,506 A | 7/1989 | Archer |
| 4,849,399 A | 7/1989 | Joy, III |
| 4,858,117 A | 8/1989 | Dichiara |
| 4,865,877 A | 9/1989 | Yamaguchi |
| 4,885,679 A | 12/1989 | Webster, Jr. |
| 4,890,285 A | 12/1989 | Dichiara |
| 4,894,070 A | 1/1990 | Keidel |
| 4,915,981 A | 4/1990 | Traskos |
| 4,916,897 A | 4/1990 | Hayashi |
| 4,925,561 A | 5/1990 | Ishii |
| 4,928,645 A | 5/1990 | Berneburg |
| 4,928,714 A | 5/1990 | Shannon |
| 4,929,429 A | 5/1990 | Merry |
| 4,934,142 A | 6/1990 | Hayashi |
| 4,935,178 A | 6/1990 | Esposito |
| 4,940,523 A | 7/1990 | Takeshima |
| 4,942,020 A | 7/1990 | Whittenberger |
| 4,952,896 A | 8/1990 | Dawson, Jr. |
| 4,955,164 A | 9/1990 | Hashish |
| 4,957,773 A | 9/1990 | Spencer |
| 4,968,383 A | 11/1990 | Volkmann |
| 4,970,035 A | 11/1990 | Baarsch |
| 4,976,760 A | 12/1990 | Helferich |
| 4,976,929 A | 12/1990 | Cornelison |
| 4,988,290 A | 1/1991 | Forster |
| 5,006,021 A | 4/1991 | Wheetley |
| 5,007,475 A | 4/1991 | Kennedy |
| 5,008,086 A | 4/1991 | Merry |
| 5,013,405 A | 5/1991 | Izard |
| 5,015,610 A | 5/1991 | Dwivedi |
| 5,021,369 A | 6/1991 | Ackerman |
| 5,024,979 A | 6/1991 | Debaig-Valade |
| 5,028,397 A | 7/1991 | Merry |
| 5,043,244 A | 8/1991 | Cairncross |
| 5,053,062 A | 10/1991 | Barris |
| 5,062,911 A | 11/1991 | Hampton |
| 5,063,029 A | 11/1991 | Mizuno |
| 5,065,757 A | 11/1991 | Dragisic |
| 5,066,432 A | 11/1991 | Gabathuler |
| 5,070,591 A | 12/1991 | Quick |
| 5,075,160 A | 12/1991 | Stinton |
| 5,079,082 A | 1/1992 | Leiser |
| 5,087,272 A | 2/1992 | Nixdorf |
| 5,089,236 A | 2/1992 | Clerc |
| 5,106,397 A | 4/1992 | Jaroszczyk |
| 5,114,901 A | 5/1992 | Tsang |
| 5,117,939 A | 6/1992 | Noguchi |
| 5,124,302 A | 6/1992 | Lachman |
| 5,151,819 A | 9/1992 | Stephens |
| 5,154,373 A | 10/1992 | Scott |
| 5,154,894 A | 10/1992 | MacFarlane |
| 5,154,901 A | 10/1992 | Yoshida |
| 5,167,934 A | 12/1992 | Wolf |
| 5,168,085 A | 12/1992 | Addiego |
| 5,171,341 A | 12/1992 | Merry |
| 5,173,349 A | 12/1992 | Yavuz |
| 5,174,969 A | 12/1992 | Fischer |
| 5,179,061 A | 1/1993 | Haerle |
| 5,180,409 A | 1/1993 | Fischer |
| 5,186,903 A | 2/1993 | Cornwell |
| 5,194,078 A | 3/1993 | Yonemura |
| 5,195,319 A | 3/1993 | Stobbe |
| 5,196,120 A | 3/1993 | White |
| 5,210,062 A | 5/1993 | Narula |
| 5,231,409 A | 7/1993 | Astier |
| 5,232,671 A | 8/1993 | Brunson |
| 5,238,386 A | 8/1993 | Cunningham |
| 5,244,852 A | 9/1993 | Lachman |
| 5,248,481 A | 9/1993 | Bloom |
| 5,248,482 A | 9/1993 | Bloom |
| 5,250,094 A | 10/1993 | Chung |
| 5,258,150 A | 11/1993 | Merckel |
| 5,258,164 A | 11/1993 | Bloom |
| 5,260,125 A | 11/1993 | Copes |
| 5,262,129 A | 11/1993 | Terada |
| 5,266,548 A | 11/1993 | Koradia |
| 5,270,551 A | 12/1993 | Kamimura |
| 5,271,906 A | 12/1993 | Yuuki |
| 5,272,125 A | 12/1993 | Weible |
| 5,279,737 A | 1/1994 | Sekhar |
| 5,290,350 A | 3/1994 | Besnard |
| 5,294,409 A | 3/1994 | Cohen |
| 5,294,411 A | 3/1994 | Breuer |
| 5,298,046 A | 3/1994 | Peisert |
| 5,303,547 A | 4/1994 | Mieville |
| 5,304,520 A | 4/1994 | Dwivedi |
| 5,334,570 A | 8/1994 | Beauseigneur |
| 5,338,903 A | 8/1994 | Winberg |
| 5,339,629 A | 8/1994 | Winberg |
| 5,376,598 A | 12/1994 | Preedy |
| 5,380,580 A | 1/1995 | Rogers |
| 5,380,621 A | 1/1995 | Dichiara |
| 5,391,428 A | 2/1995 | Zender |
| 5,393,499 A | 2/1995 | Bagley |
| 5,401,614 A | 3/1995 | Dichiara |
| 5,408,827 A | 4/1995 | Holtermann |
| 5,409,669 A | 4/1995 | Smith |
| 5,429,780 A | 7/1995 | Prin |
| 5,436,216 A | 7/1995 | Toyao |
| 5,449,654 A | 9/1995 | Prin |
| 5,451,444 A | 9/1995 | DeLiso |
| 5,453,116 A | 9/1995 | Fischer |
| 5,455,594 A | 10/1995 | Blasing |
| 5,456,965 A | 10/1995 | Machida |
| 5,458,944 A | 10/1995 | Austin |
| 5,463,206 A | 10/1995 | Abe |
| 5,466,917 A | 11/1995 | Matsuki |
| 5,482,538 A | 1/1996 | Becker |

| Patent | Date | Name |
|---|---|---|
| 5,482,817 A | 1/1996 | Dichiara |
| 5,486,399 A | 1/1996 | Brydon |
| 5,487,865 A | 1/1996 | Hampton |
| 5,501,842 A | 3/1996 | Rajnik |
| 5,504,281 A | 4/1996 | Whitney |
| 5,511,747 A | 4/1996 | Parrot |
| 5,516,580 A | 5/1996 | Frenette |
| 5,519,191 A | 5/1996 | Ketcham |
| 5,523,059 A | 6/1996 | Langer |
| 5,526,462 A | 6/1996 | Kondo |
| 5,536,562 A | 7/1996 | Tran |
| 5,540,981 A | 7/1996 | Gallagher |
| 5,551,239 A | 9/1996 | Feeley |
| 5,552,360 A | 9/1996 | Farrauto |
| 5,553,455 A | 9/1996 | Craig |
| 5,554,485 A | 9/1996 | Dichiara |
| 5,567,536 A | 10/1996 | Lintz |
| 5,569,441 A | 10/1996 | Engler |
| 5,582,805 A | 12/1996 | Yoshizaki |
| 5,589,143 A | 12/1996 | Mori |
| 5,593,647 A | 1/1997 | Kirby |
| 5,599,510 A | 2/1997 | Kaminsky |
| 5,601,259 A | 2/1997 | Dichiara |
| 5,611,832 A | 3/1997 | Suzuki |
| 5,614,155 A | 3/1997 | Abe |
| 5,618,500 A | 4/1997 | Wang |
| 5,626,951 A | 5/1997 | Hogenson |
| 5,629,067 A | 5/1997 | Kotani |
| 5,629,186 A | 5/1997 | Yasukawa |
| 5,632,320 A | 5/1997 | Atmur |
| 5,637,399 A | 6/1997 | Yoshikawa |
| 5,656,048 A | 8/1997 | Smith |
| 5,660,778 A | 8/1997 | Ketcham |
| 5,666,804 A | 9/1997 | Sekiya |
| 5,674,802 A | 10/1997 | Sheppard |
| 5,686,039 A | 11/1997 | Merry |
| 5,686,368 A | 11/1997 | Wong |
| 5,687,046 A | 11/1997 | Mathews |
| 5,687,787 A | 11/1997 | Atmur |
| 5,691,736 A | 11/1997 | Hunn |
| 5,692,373 A | 12/1997 | Atmur |
| 5,702,494 A | 12/1997 | Tompkins |
| 5,702,761 A | 12/1997 | Dichiara, Jr. |
| 5,705,118 A | 1/1998 | Hayes |
| 5,705,129 A | 1/1998 | Takahashi |
| 5,705,444 A | 1/1998 | Tompkins |
| 5,721,188 A | 2/1998 | Sung |
| 5,730,096 A | 3/1998 | Atmur |
| 5,732,555 A | 3/1998 | Gracyalny |
| 5,736,107 A | 4/1998 | Inomata |
| 5,742,254 A | 4/1998 | Bassaler |
| 5,744,763 A | 4/1998 | Iwasa |
| 5,749,223 A | 5/1998 | Kreucher |
| 5,750,026 A | 5/1998 | Gadkaree |
| 5,766,458 A | 6/1998 | Sekhar |
| 5,772,154 A | 6/1998 | Stewart |
| 5,773,143 A | 6/1998 | Vermilion |
| 5,780,126 A | 7/1998 | Smith |
| 5,783,515 A | 7/1998 | Sakurai |
| 5,795,456 A | 8/1998 | Friedman |
| 5,801,806 A | 9/1998 | Dichiara |
| 5,814,397 A | 9/1998 | Cagliostro |
| 5,827,577 A | 10/1998 | Spencer |
| 5,830,250 A | 11/1998 | Shirk |
| 5,842,342 A | 12/1998 | Strasser |
| 5,844,200 A | 12/1998 | Leader |
| 5,849,375 A | 12/1998 | Smith |
| 5,849,406 A | 12/1998 | Daws |
| 5,851,647 A | 12/1998 | Foster |
| 5,853,675 A | 12/1998 | Howorth |
| 5,853,684 A | 12/1998 | Fang |
| 5,856,263 A | 1/1999 | Bhasin |
| 5,866,210 A | 2/1999 | Rosynsky |
| 5,872,067 A | 2/1999 | Meng |
| 5,876,529 A | 3/1999 | Grant |
| 5,879,640 A | 3/1999 | Atmur |
| 5,882,608 A | 3/1999 | Sanocki |
| 5,883,021 A | 3/1999 | Beer |
| 5,884,864 A | 3/1999 | Sunne |
| 5,907,273 A | 5/1999 | Ross, Jr. |
| 5,910,095 A | 6/1999 | Strasser |
| 5,925,156 A | 7/1999 | Motoki |
| 5,928,448 A | 7/1999 | Daws |
| 5,928,775 A | 7/1999 | Dichiara, Jr. |
| 5,932,496 A | 8/1999 | Morris |
| 5,939,141 A | 8/1999 | Cagliostro |
| 5,943,857 A | 8/1999 | Ansell |
| 5,948,146 A | 9/1999 | Thomaides |
| 5,948,257 A | 9/1999 | Custer |
| 5,955,177 A | 9/1999 | Sanocki |
| 6,444,006 B1 * | 9/2002 | Haberkamp et al. ........... 55/521 |
| 6,632,412 B2 | 10/2003 | Peltola |
| 6,632,540 B2 | 10/2003 | Dichiara, Jr. |
| 6,641,795 B2 | 11/2003 | Abe |
| 6,652,446 B1 | 11/2003 | Bove |
| 6,652,950 B2 | 11/2003 | Barney |
| 6,660,115 B2 | 12/2003 | Butler |
| 6,663,051 B2 | 12/2003 | Okuyama |
| 6,663,839 B2 | 12/2003 | Platvoet |
| 6,669,265 B2 | 12/2003 | Tilton |
| 6,669,913 B1 | 12/2003 | Haberkamp |
| 6,673,136 B2 | 1/2004 | Gillingham |
| 6,676,077 B1 | 1/2004 | Dichiara, Jr. |
| 6,676,745 B2 | 1/2004 | Merkley |
| 6,698,193 B2 | 3/2004 | Duerr |
| 6,699,342 B2 | 3/2004 | Dichiara, Jr. |
| 6,699,555 B2 | 3/2004 | Dichiara, Jr. |
| 6,712,318 B2 | 3/2004 | Gubert |
| 6,726,884 B1 | 4/2004 | Dillon |
| 6,770,584 B2 | 8/2004 | Barney |
| 6,946,013 B2 * | 9/2005 | Alward et al. ................. 55/523 |
| 2001/0002287 A1 | 5/2001 | Kar |
| 2001/0037729 A1 | 11/2001 | Machida |
| 2001/0043891 A1 | 11/2001 | Adiletta |
| 2002/0004450 A1 | 1/2002 | Gaffney |
| 2002/0087042 A1 | 7/2002 | Schmidt |
| 2002/0149128 A1 | 10/2002 | Dichiara, Jr. |
| 2002/0150526 A1 | 10/2002 | Hopkins |
| 2002/0157358 A1 | 10/2002 | Noda |
| 2002/0177520 A1 * | 11/2002 | Tanaka et al. ............... 502/150 |
| 2002/0192512 A1 | 12/2002 | Dichiara, Jr. |
| 2003/0003232 A1 | 1/2003 | Rosynsky |
| 2003/0022783 A1 | 1/2003 | Dichiara, Jr. |
| 2003/0032545 A1 | 2/2003 | Dichiara, Jr. |
| 2003/0036477 A1 | 2/2003 | Nordquist |
| 2003/0068153 A1 | 4/2003 | Suzuki |
| 2003/0082414 A1 | 5/2003 | Dichiara, Jr. |
| 2003/0115859 A1 | 6/2003 | Deeba |
| 2003/0138585 A1 | 7/2003 | Dichiara, Jr. |
| 2003/0152432 A1 | 8/2003 | Meece |
| 2003/0165638 A1 | 9/2003 | Louks |
| 2003/0183008 A1 | 10/2003 | Bang |
| 2003/0205310 A1 | 11/2003 | Dichiara, Jr. |
| 2004/0001781 A1 | 1/2004 | Kumar |
| 2004/0001782 A1 | 1/2004 | Kumar |
| 2004/0028587 A1 | 2/2004 | Twigg |
| 2004/0031643 A1 | 2/2004 | Wagner |
| 2004/0056151 A1 | 3/2004 | Dichiara, Jr. |
| 2004/0091699 A1 | 5/2004 | Denham |
| 2004/0091736 A1 | 5/2004 | Dichiara, Jr. |
| 2004/0096619 A1 | 5/2004 | Dichiara, Jr. |
| 2004/0132607 A1 | 7/2004 | Wood |
| 2004/0176246 A1 | 9/2004 | Shirk |

| | | | | | | |
|---|---|---|---|---|---|---|
| 2005/0042151 A1 | 2/2005 | Alward et al. | | WO | WO0173126 | 10/2001 |
| | | | | WO | WO0183956 | 11/2001 |
| FOREIGN PATENT DOCUMENTS | | | | WO | WO0194760 | 12/2001 |
| | | | | WO | WO0197952 | 12/2001 |
| EP | 0047525 | 3/1982 | | WO | WO03053542 | 7/2003 |
| EP | 0187256 | 7/1986 | | WO | WO03068362 | 8/2003 |
| EP | 0278597 | 8/1988 | | WO | WO03069595 | 8/2003 |
| EP | 0244109 | 9/1990 | | WO | WO2004011783 | 2/2004 |
| EP | 0412315 | 2/1991 | | WO | WO2004011785 | 2/2004 |
| EP | 0124863 | 4/1991 | | WO | WO-2004/018079 | 3/2004 |
| EP | 0421159 | 4/1991 | | | | |
| EP | 0433582 | 6/1991 | | | | |
| EP | 0202733 | 7/1991 | | | | |
| EP | 0441401 | 8/1991 | | | | |
| EP | 0251150 | 12/1991 | | | | |
| EP | 0471590 | 2/1992 | | | | |
| EP | 0561019 | 3/1992 | | | | |
| EP | 0500154 | 8/1992 | | | | |
| EP | 0554104 | 8/1993 | | | | |
| EP | 0236071 | 10/1993 | | | | |
| EP | 0345795 | 11/1993 | | | | |
| EP | 0570698 | 11/1993 | | | | |
| EP | 0431648 | 3/1995 | | | | |
| EP | 0848535 | 4/1995 | | | | |
| EP | 0588182 | 5/1995 | | | | |
| EP | 0600971 | 11/1995 | | | | |
| EP | 0704241 | 4/1996 | | | | |
| EP | 0618353 | 7/1996 | | | | |
| EP | 0727567 | 8/1996 | | | | |
| EP | 0734757 | 10/1996 | | | | |
| EP | 0737859 | 10/1996 | | | | |
| EP | 0750971 | 1/1997 | | | | |
| EP | 0769822 | 4/1997 | | | | |
| EP | 0692995 | 7/1997 | | | | |
| EP | 0790216 | 8/1997 | | | | |
| EP | 0819459 | 1/1998 | | | | |
| EP | 0599595 | 4/1998 | | | | |
| EP | 0835368 | 4/1998 | | | | |
| EP | 0884459 | 12/1998 | | | | |
| EP | 0668252 | 1/2000 | | | | |
| EP | 1052010 | 11/2000 | | | | |
| EP | 1085352 | 3/2001 | | | | |
| EP | 1125704 | 8/2001 | | | | |
| EP | 1163970 | 12/2001 | | | | |
| EP | 1180390 | 2/2002 | | | | |
| EP | 0958874 | 5/2002 | | | | |
| EP | 1205228 | 5/2002 | | | | |
| EP | 0856645 | 7/2002 | | | | |
| EP | 1254715 | 11/2002 | | | | |
| EP | 1222661 | 5/2003 | | | | |
| EP | 1326012 | 7/2003 | | | | |
| EP | 1331118 | 7/2003 | | | | |
| EP | 1032755 | 11/2003 | | | | |
| EP | 1366801 | 12/2003 | | | | |
| EP | 1342889 | 9/2005 | | | | |
| WO | WO-90/14224 | 11/1990 | | | | |
| WO | WO9303262 | 2/1993 | | | | |
| WO | WO9416134 | 7/1994 | | | | |
| WO | WO-95/00235 | 1/1995 | | | | |
| WO | WO9620787 | 7/1996 | | | | |
| WO | WO-96/39244 | 12/1996 | | | | |
| WO | WO-97/02413 | 1/1997 | | | | |
| WO | WO9701599 | 1/1997 | | | | |
| WO | WO-97/48890 | 12/1997 | | | | |
| WO | WO-98/02649 | 1/1998 | | | | |
| WO | WO9927206 | 6/1999 | | | | |
| WO | WO9955459 | 11/1999 | | | | |
| WO | WO0008315 | 2/2000 | | | | |
| WO | WO0021903 | 4/2000 | | | | |
| WO | WO0070915 | 11/2000 | | | | |
| WO | WO0071863 | 11/2000 | | | | |
| WO | WO0154801 | 8/2001 | | | | |
| WO | WO0172663 | 10/2001 | | | | |

OTHER PUBLICATIONS

Cutler et al., A New High Temperature Ceramic Material for Diesel Particulate Filter Applications, SAE Technical Paper Series 2000-01-2844, Oct. 2000.

Chant et al., Aluminum Clad Ferritic Stainless Steel Foil for Metallic Catalytic Converter Substrate Applications, SAE Technical Paper Series 960556, Feb. 1996.

Brogan et al., Recent Progress in NOx Trap Technology, SAE Technical Paper Series 980933, Feb. 1998.

Dou et al., Investigation of NOx Adsorber Catalyst Deactivation, SAE Technical Paper Series 982594, Oct. 1998.

Aaronson et al., Diesel Odor and the Formation of Aromatic Hydrocarbons During the Heterogeneous Combustion of Pure Cetane in a Single-Cylinder Diesel Engine, Thirteenth Symposium on Combustion, Aug. 1970.

Bascom et al., Design Factors that Affect Diesel Emissions.

Cooper et al., Role of NO in Diesel Particulate Emission Control.

Iiurn, Air Pollution and the Compression-Ignition Engine, Twelfth Symposium on Combustion, Jul. 1968.

Cooke, Inorganic Fibers—A Literature Review, Journal of the American Ceramic Society, 1991.

Fernando et al., Improving an Alumina Fiber Filter Membrane for Hot Gas Filtration Using an Acid Phosphate Binder, Journal of Materials Science, 2001.

Wall-Flow Monoliths, www.DieselNet.com, 2004.

Diesel Filter Materials, www.DieselNet.com, 2003.

Ceramic Catalyst Substrates, www.DieselNet.com, 1997.

Khair, Air-to-Air Intercooling of the Ford 7.8L Mid-Range Truck Diesel Engine, SAE Technical Paper Series 870534, Feb. 1987.

Khan et al., Progress of Diesel Combustion Research, CIMAC 9th International Congress on combustion Engines, 1971.

McCarthy, Diesel Fuel Property Effects on Exhaust Emissions from a Heavy Duty Diesel Engine that Meets 1994 Emissions Requirements, SAE Technical Paper Series 922267, Oct. 1992.

Merrion, Effect of Design Revisions on Two Stroke Cycle Diesel Engine Exhaust.

Nakatsuji et al., Highly Durable NOx Reduction System and Catalysts for NOx Storage Reduction System, SAE Technical Paper Series 980932, Feb. 1998.

Miyamoto et al., Description of Diesel Emissions by Individual Fuel Properties, SAE Technical Paper Series 922221, Oct. 1992.

Komiyama et al., Predicting NOx Emissions and Effects of Exhaust Gas Recirculation in Spark-Ignition Engines, Society of Automotive Engineers, May 1973.

Marshall et al., Factors Influencing Diesel Emissions, Society of Automotive Engineers, Inc., Aug. 1968.

Newhall et al., Direct Spectroscopic Determination of Nitric Oxide in Reciprocating Engine Cylinders, Society of Automotive Engineers, Inc., Jan. 1967

Olson, Diesel Emission Control Devices—Design Factors Affecting Mounting Mat Selection, SAE Technical Paper Series 2004-01-1420, Mar. 2004.

Page, Optimization of the Air/Fuel Ratio for Improved Engine Performance and Reduced Emissions, SAE Technical Paper Series 961714, Aug. 1995.

Perez et al., Exhaust Emission Characteristics of Precombustion Chamber Engines.

Tuomola et al., A New Metallic Catalyst, SAE Technical paper Series 2002-01-0357, Mar. 2002.

Pischinger, The Diesel Engine for Cars—Is There a Future?, ICE Fall Technical Conference, 1996.

Wright et al., A Novel Electrostatic Method of Ultrafine PM Control Suitable for Low Exhaust Temperature Applications, SAE Technical Paper Series 2003-01-0771, Mar. 2003.

Watts et al., Air Motion and Fuel Distribution Requirements in High-Speed Direct Injection Diesel Engines, The Institution of Mechanical Engineers, 1969-1970.

Ullman et al., Effects of Fuel Aromatics, Cetane Number, and Cetane Improver on Emissions from a 1991 Prototype Heavy-Duty Diesel Engine, SAE Technical Paper Series 902171, Oct. 1990.

Anderson, Michael J., "Ultra Thin Wall Mat Design and Optimization with Hybrid Mats", *SAE Technical Paper Series 2004-01-0145*, (Mar. 2004).

Gulati, Suresh T., "Physical Durability of Thin Wall Ceramic Substrates", *SAE Technical Paper Series 982635*, (Oct. 1998).

Lavoie, George A., et al., "Experimental and Theoretical Study of Nitric Oxide Formation in Internal Combustion Engines", *Combustion Science and Technology*, (1970).

\* cited by examiner

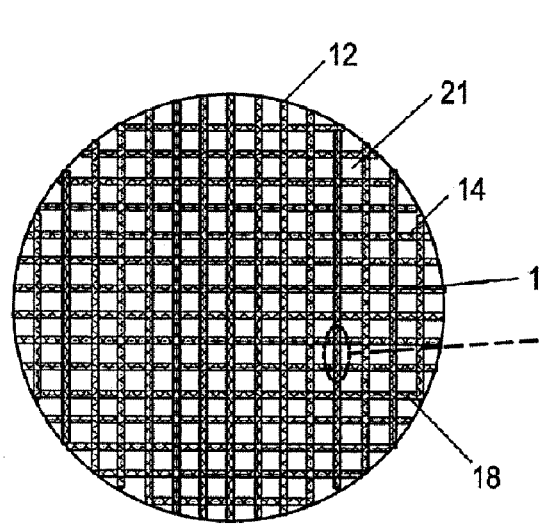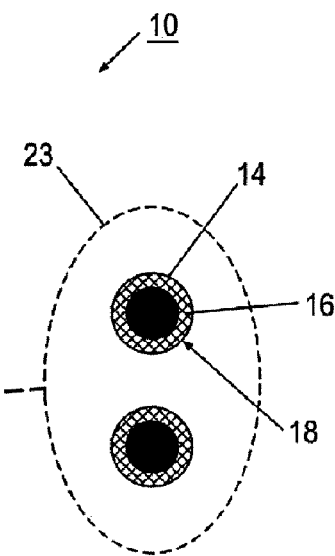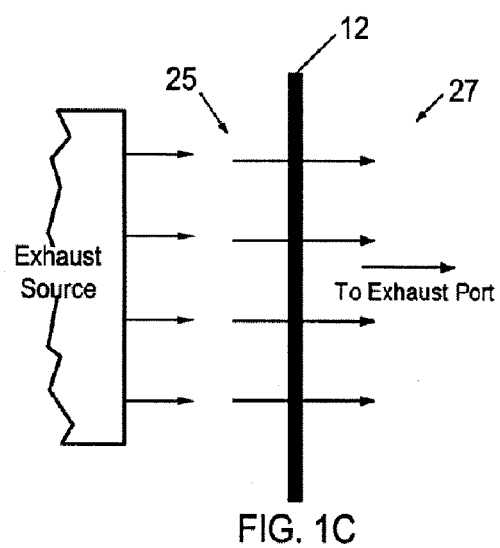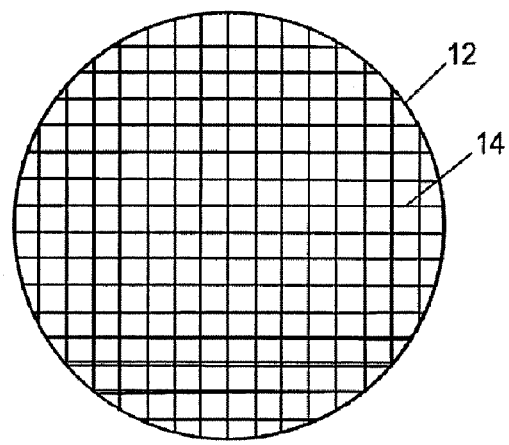
FIG. 1A
FIG. 1B
FIG. 1C
FIG. 1D

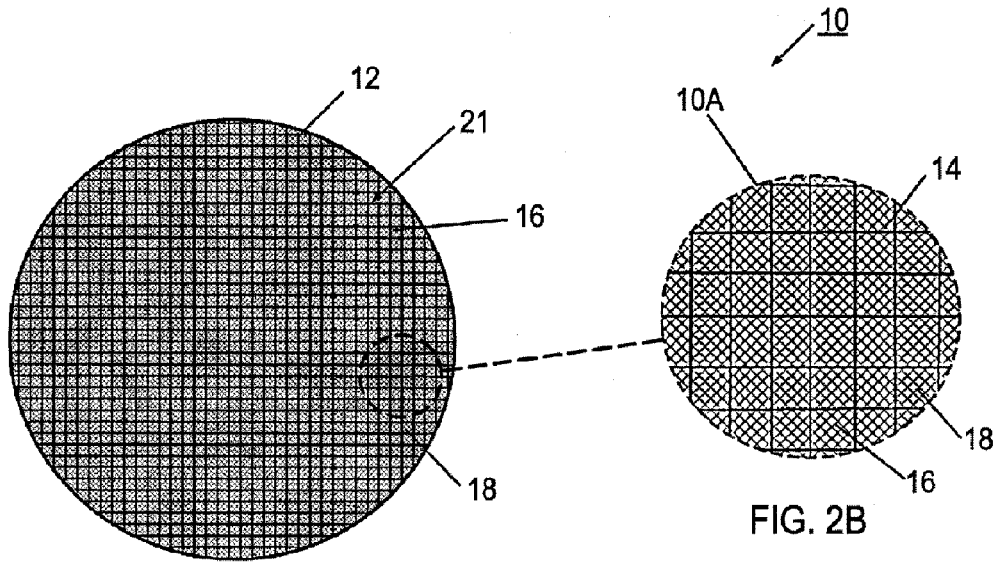
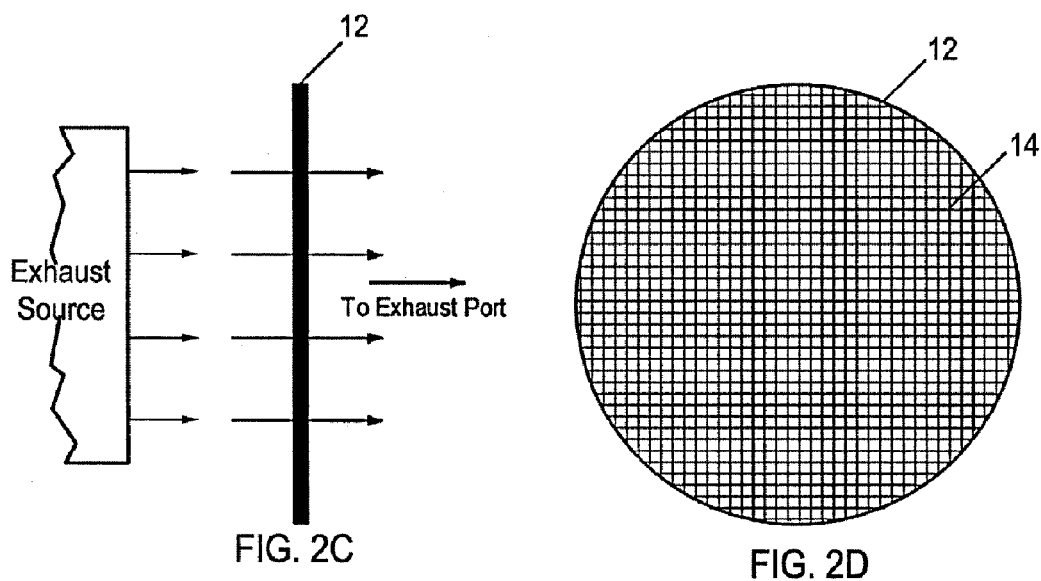

SUBSTANTIALLY FIBROUS EXHAUST SCREENING SYSTEM FOR MOTOR VEHICLES

FIELD

The present invention relates generally to a device for catalyzing the conversion of pollutant gasses into non-pollutant gasses, and more particularly, to a catalytic converter device for quick installation or replacement on a vehicle or other like exhaust system.

DESCRIPTION OF RELATED ART

Exhaust systems perform several functions for a modern engine. For example, the exhaust system is expected to manage heat, reduce pollutants, control noise, and sometimes filter particulate matter from exhaust emissions. Generally, these individual functions are performed by separate and distinct components. Take, for example, the exhaust system of a typical small gasoline engine. The small engine exhaust system may use a set of heat exchangers or external baffles to capture and dissipate heat. A separate muffler may be coupled to the exhaust outlet to control noise, while a catalytic converter assembly may be placed in the exhaust fluid path to reduce the concentration of non-particulate pollutants. Although particulates may not generally be a concern in the small gasoline engine, some applications may benefit from the use of a separate particulate filter. Due to space limitations, costs, and engine performance issues, it is not always possible to include separate devices to perform all the desired functions, thereby resulting in an exhaust system that is undesirably hot, polluting, or noisy.

Known exhaust systems are often supplied with catalytic devices to support non-particulate emission control. Due to the physical size, mass and reactivity requirements for these devices, their placement options are quite limited. Each device that must be placed adds additional design time, cost, and weight and also consumes valuable and limited space in the product. As emission requirements tighten, it is likely that more catalytic effect will be required, as well as further particulate control. In other engines, it has not always been possible to find a safe and effective placement location for catalytic devices. These engines, such as small internal combustion engines (ICE), are often found in on-road vehicles, off-road vehicles, motorcycles, lawn equipment, construction and mining equipment, small utility engines, and the like. Unfortunately, these small engines have not been able to fully benefit from catalytic technologies. Additionally, other pollution sources and/or areas where catalytic conversion of pollutant gasses could be beneficial include environmental cleanup, ozone reduction, industrial processes, gas compression, power generation, fuel cells, and the like. In many applications, there is a need for a flexible, yet highly effective method to catalyze and remove the harmful emissions. The ability to reduce noise pollution, as well as prevent injuries or harm due to excess heat generation is also desirable.

In both gasoline and (especially) diesel engines, a major pollutant is particulate matter (such as soot). Soot particles are small, usually ranging from an effective diameter of 10 nm to about 1 micron and above. While there are general EPA guidelines regarding overall particulate matter concentrations that may be emitted, there are also strict regulations regarding soot emissions from engines. Diesel engines produce significantly more soot than do gasoline engines, but with certain emission control systems included in the diesel exhaust system, the particulate matter pollution arising from gasoline engines may now be the same or worse. Additionally, older automobiles (also known as gross-emitters) have considerably higher particulate and non-particulate emission levels. In some applications where particulate emissions need to be controlled, diesel particulate filters, either catalyzed or uncatalyzed, in combination with other emission control technologies (such as a diesel oxidation catalyst) have been found to be effective.

Known catalytic systems do not effectively operate until a threshold operational temperature is reached. During this "light-off" period, substantial particulate and non-particulate pollution is emitted into the atmosphere. Accordingly, it is often desirable to place a catalytic device close to the engine manifold, where exhaust gasses are hottest. In this way, the catalyst may more quickly reach its operational temperature. However, design or safety constraints may limit placement of the catalytic converter to a position spaced away from the manifold. Since these catalytic converters are spaced away from the manifold, light off time is increased, and additional pollutants are exhausted to the atmosphere.

Certain catalytic devices, such as the typical honeycomb catalytic converters developed for the automobile industry, cause significant back-pressure, occupy large volumes to reach high conversion at large spatial velocities, and add significant weight to the vehicle. Unfortunately, other catalytic or filtering solutions are heretofore unable to withstand the harsh operating environments that are associated with these applications (i.e., vibration, shock, acceleration, temperature, thermal shock, acid or alkaline chemical environments, etc. . . . ).

Many engines are in current operation with non-working, limited, or no catalytic converters. For example, many older cars have no converter at all, and those manufactured just a few years ago were required to meet exhaust standards much less stringent than current standards. Also, many vehicles have failing or under-performing emission systems. Some states have emission testing to identify these vehicles, and require that the vehicle emission system be repaired. However, most states have limits as to how much a vehicle owner must spend to repair the emission system, and if the repair would exceed this amount, the owner is not required to make the repair. Since emission system repair is quite expensive, many vehicles are allowed to continue exceeding pollution standards because no cost-effective repair solution is available. Similarly, school busses, trucks, and other diesel vehicles currently do not have any filters installed on them and there is thus the need for retrofit installation to meet current and projected regulations, reduce and reverse environments damage, and protect human life and livelihood.

Air pollution standards, particularly vehicle exhaust gasses, are coming under increased pressure from governments and environmental organizations. The consequence of continued emissions is well recognized, with additional regulations being added and existing regulations more aggressively enforced. However, reduced emissions and more stringent emission regulations may have a short-term negative impact on the overall economy, as additional monies must be spent to meet higher standards. Indeed, governments have been relatively slow to adapt tighter regulations, citing competitive and economic consequences. Accordingly, a more cost effective and efficient catalytic device may ease the transition to a cleaner world, without substantial detrimental economic effects. In particular, it would desirable to provide a cost effective catalytic device that is capable of easy installation on vehicles, small engines, and in industrial exhaust stacks.

SUMMARY

Briefly, the present invention provides a simple catalytic device that is easily installed into vehicles, small engines, industrial exhaust stacks and other locations where catalytic conversion of exhaust gasses and/or filtration of particulates is required. The simple catalytic device has a refractive and stable backbone structure that withstands expected mechanical forces. In one example, the backbone is a highly gas-permeable mesh or screen. A substantially fibrous nonwoven refractory material is disposed on the backbone, with a catalytic material coating applied to the fibrous material. In one example only the solid structural components of the backbone are covered with a fibrous refractory layer. In another example, the entire backbone structure, including the gaps between the solid portions, is fully enclosed within the fibrous layer. The catalytic device is constructed to be installable in an exhaust path, where it provides a catalytic conversion for non-particulate matter.

In a more specific example, the exhaust fluid treatment device is constructed as a catalytic screen. The catalytic screen includes a fluid permeable backbone member defining a plurality of apertures that supports a substantially fibrous porous nonwoven refractory material portion disposed thereon. A catalyst material portion is adhered to the substantially fibrous porous nonwoven refractory material portion. The screen may be operationally connected in an exhaust path extending from an exhaust gas source, such as an engine, to the atmosphere to capture particulate matter and/or catalyze the conversion of pollutants in the exhaust gas into non-pollutants.

In another specific example, the exhaust gas treatment system for removing is constructed to include a conduit portion connecting an exhaust gas filter portion to an exhaust gas source. The conduit portion may be part of a pre-existing or in-service vehicle, such as an exhaust pipe of an automobile, and may have a slot or the like formed thereinto for receiving the exhaust gas filter portion. The exhaust gas filter includes a housing portion with a gas permeable backbone portion operationally connected thereto. A substantially fibrous nonwoven refractory material portion disposed on the backbone portion. The system may be operationally connected to an exhaust gas source, such as an engine, to capture particulate matter and/or catalyze the conversion of pollutants in the exhaust gas into non-pollutants. Exhaust gasses thus pass through the filter as they travel toward the atmosphere.

In another specific example, more suited to applications where particulate trapping is desirable, the refractory screening device is constructed as a wall-flow honeycomb diesel particulate filter, a wall-flow tube, or a doughnut-shaped wall-flow diesel particulate filter, wherein the walls of the substrate through which the affluent flows contain an internal backbone structure composed of rigid, structural material (such as wire mesh).

Advantageously, the catalytic device provides a simplified and cost effective means for reducing dangerous exhaust gases. For example, the catalytic device may be attached to a small engine, either as the sole catalytic device or to assist existing devices. In another example, the catalytic device may be coupled into an existing vehicle exhaust system, thereby enabling a cost-effective way to reduce emissions for existing vehicles. Also, the catalytic device may be constructed as a replacement part. This is particularly useful in an application, such as with 2-cycle engines, where the catalytic effect of original equipment diminishes over time due to expelled oil. Further, industrial and residential applications may also benefit from a simple catalytic device. Stoves, heaters, furnaces, evaporators, and other exhausting devices may be provided with cost effective and enhanced emission control. The catalytic device may be disposable or readily serviceable to remove debris resulting from oil, fuel, soot, or ash deposition. The catalytic device may be used as a retrofit device on equipment using diesel engines, such as mining equipment, trucks, power generators, backup generators, marine engines, agricultural engines, automobiles, and the like.

The catalytic device may be incorporated in series, parallel, or on within other emission control or catalytic conversion and/or filtration equipment, such as catalytic converters, mufflers, diesel oxidation catalysts, catalyzed exhaust tubes, catalytic combustors, incinerators, and the like.

These and other features of the present invention will become apparent from a reading of the following description, and may be realized by means of the instrumentalities and combinations particularly pointed out in the appended claims.

DESCRIPTION OF THE DRAWINGS

The drawings constitute a part of this specification and include exemplary embodiments of the invention, which may be embodied in various forms. It is to be understood that in some instances various aspects of the invention may be shown exaggerated or enlarged to facilitate an understanding of the invention.

FIG. 1 is a diagram of a catalytic screen in accordance with the present invention.

FIG. 2 is a diagram of a catalytic screen in accordance with the present invention.

DETAILED DESCRIPTION

Figure 3A:
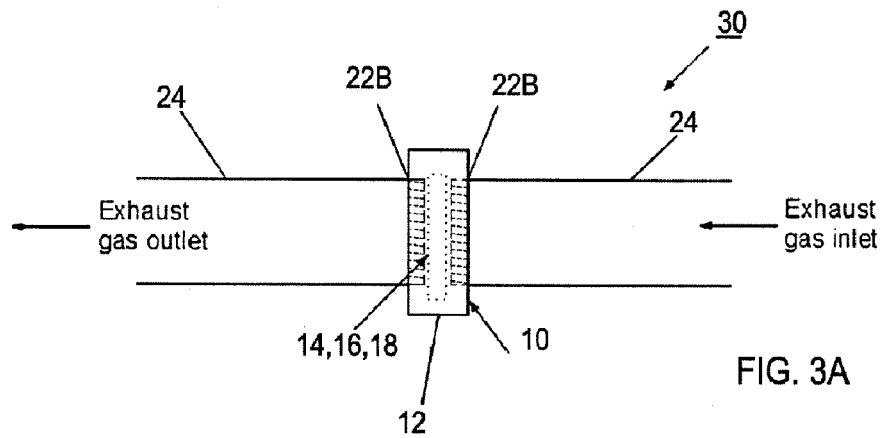
FIG. 3 is a diagram of an installed catalytic screen in accordance with the present invention.

Detailed descriptions of examples of the invention are provided herein. It is to be understood, however, that the present invention may be exemplified in various forms. Therefore, the specific details disclosed herein are not to be interpreted as limiting, but rather as a representative basis for teaching one skilled in the art how to employ the present invention in virtually any detailed system, structure, or manner.

The drawing figures herein illustrate and refer to an exhaust system pathway that is specifically described as a component of an internal combustion engine exhaust system. However, it should be appreciated that exhaust pathway may be used on other types of exhaust systems. For example, the exhaust system may be for the petrochemical, biomedical, chemical processing, painting shops, laundromat, industrial exhaust, generation plant, or commercial kitchen applications.

Generally, a catalytic converting device consists of a host or a structural substrate support, and a catalyst that coats the support. A catalytic device contains the appropriate type and mass of support and catalyst so that it can fulfill a precise catalytic function. For example, it may perform a conversion function, such as the conversion of gases into other gaseous products, liquids into other liquids, liquids into gaseous products, solids into liquids, solids into gaseous products or any combination of these specific conversions. Generally, the conversion reaction or reactions are deliberate and well-defined in the context of a particular application, e.g. simultaneous conversion of NOx, HC, CO, conversion of methyl tertiary butyl ether (MTBE) to CO2 and steam, soot to CO2 and steam, and the like.

Referring now to FIG. 1, a catalytic device in the form of catalytic screen 10 is illustrated. Catalytic screen 10 may be sized and constructed to be placed in the exhaust path of an exhaust system. For example, catalytic screen 10 may be positioned in the stream of gasses produced through the operation of an internal combustion engine and traveling therefrom to the atmosphere, or installed in the path of exhaust gasses flowing from a residential or commercial oven, placed in an area of relatively highly concentrated pollutant fluids desired to be eliminated, or the like. It will be appreciated that catalytic screen 10 may take many sizes and shapes, depending on the particular operating environment and/or application needs.

Generally, catalytic screen 10 includes a structural housing portion 12 to which a backbone support structure 14 is connected. A substantially fibrous, typically nonwoven refractory material 16 is disposed on the backbone 14. The backbone 14 may be a screen, mesh, perforated sheet, wire construct, or the like that is permeable to the flow of gas therethrough. Typically, the backbone 14 is formed from a structural refractory material, such as steel, a highly densified ceramic, or a cer-met composite material; while the backbone 14 itself is gas permeable, its constituent material may be impervious and substantially non-porous. A catalytic material 18 is disposed on at least some of the fibrous material 16 layer. The catalyst material 18 may be added during the formation of the fibrous layer 16, such as at the slurry or green body stage, or may be applied later at the finished body stage. Typically, the fibrous material 16 is disposed on backbone portion 14 so as to leave relatively large exhaust apertures or channels 21, although the fibrous material 16 may be sufficiently thick so as to leave small channels 21, or even substantially no channels 21. It will be appreciated that overall catalytic conversion efficiency and backpressure may be adjusted according to the density of support structure 14, the porosity and thickness of fibrous material 16 attached thereto, the degree of coverage of the fibrous material 16 over the support structure 14, and the type and amount of catalytic material 18 coated to the fibrous layer 16. Likewise, the characteristic porosity and/or pore dimensions of the material 16 may be adjusted to optimize the reaction of particular species with particular reactive agents/catalysts 18.

The housing 12 is typically ring shaped, more typically with a generally circular cross-section, and still more typically is sized for insertion into a generally circular cross-sectioned pipe so as to substantially intersect the flow of exhaust gasses therethrough. Of course, the housing may have any regular or irregular shape convenient for positioning in the flow of an exhaust gas such that the flow is substantially intersected and forced through the area defined by the housing and filled by the support structure 14.

The housing 12 may be made of a structural material, such as aluminum, steel, or the like, and may further include a pair of couplers 22 such that the housing 12 may be inserted as a joint between two sections of conduit 24 that make up a part of the exhaust pathway from the engine to the atmosphere 26. The couplers 22 are typically threaded with matable threading formed on the ends of the pipe sections 24, such that the pipe sections 24 may be threadedly connected to the housing 12 via the couplers 22. Alternately, the housing 12 may be welded into place in the exhaust path, may be snapped into place, may be held in place by an interference fit/by frictional forces, or by any convenient attachment technique or mechanism. More typically, the housing 12 and screen 10 are disposable, i.e., easily removed and replaced.

The backbone or support structure 14 is a gas permeable structure that offers little resistance to the flow of fluids therethrough so as to cause minimal backpressure when inserted into the gas flow of an exhaust system. The backbone 14 may have the form of a screen, a mesh, a donut, a honeycomb, a perforated surface, a plurality of interconnected, crisscrossed wires, a perforated tube, single or multiple 'hole' or 'gap' distributions, or the like and may be made from any convenient structural material, typically metal or metal alloy, but may also include coated metals, metal fibers or whiskers, cements, structural ceramics (such as cordierite, silicon carbide, mullite, zirconia, alumina or the like, typically prepared from powdered precursors), densified substantially fibrous ceramic materials, cermets, or the like. For lower temperature applications, plastics and the like may be suitable backbone 14 materials.

The substantially fibrous porous nonwoven refractory material 16 is typically adhered substantially uniformly to the backbone 14. Typically, the substantially fibrous porous nonwoven refractory material 16 is coated onto to the backbone 14 with sufficient thickness such that there remain gaps or exhaust gas channels 21 between adjacent coated portions of the backbone 14. (See FIG. 1). These exhaust channels 21 typically have the form of an array of apertures 21 formed in or defined by the backbone structure 14. Alternately, the substantially fibrous porous nonwoven refractory material 16 may be coated onto the backbone 14 with sufficient thickness that the adjacent coating layers 16 intersect, leaving substantially no open exhaust gas pathways 21 but instead forcing all exhaust gas traveling from the exhaust gas source to the atmosphere to pass through at least some substantially fibrous porous nonwoven refractory material 16. (See FIG. 2).

The substantially fibrous porous nonwoven refractory material 16 coating the backbone structure 16 is typically made of a matrix of tangled (non-woven) refractory fibers. The fibers are typically chopped to a relatively short length and more typically have diameter to length aspect rations of between about 1:3 to about 1:500. Typical fiber diameters range from about 1.5 to about 15 microns and greater. Typical fiber lengths range from several microns to about 1-2 centimeters or longer, more typically exceed at least about 6 microns, and still more typically may range from about 1 to about 3 centimeters in length. Shorter lengths are typically more convenient for certain ceramic formation processes, such as extrusion. More typically, a bimodal or multimodal distribution of fiber aspect rations is used to enhance the strength of the substantially fibrous porous nonwoven refractory material layer portion 16. For example, the aspect ratios may peak at about 1:10 and about 1:90.

The substantially fibrous porous nonwoven refractory material 16 is typically a refractory material, is more typically a metal oxide, metal carbide and/or metal nitride composition, and is still more typically made of one or more of the following materials: mullite, alumina, silica, alumina-silica, mixtures of alumina and silica, alumina enhanced thermal barrier ("AETB") material (made from aluminoborosilicate fibers, silica fibers, and alumina fibers), OCTB or HTP material (made from alumina fibers, silica fibers, and boron nitride), fibrous refractory ceramic insulation (FRCI) material (mostly silica fibers), zirconia, aluminum titanate, titania, yttrium aluminum garnet (YAG), aluminoborosilicate, alumina-zirconia, alumina-silica-zirconia, silicon carbide, silicon nitride, mixtures of the same, and the like. For example, AETB is an attractive material for fibers since AETB has a high melting point, low heat conductance, low coefficient of thermal expansion, the ability to withstand thermal and vibrational shock, good chemical resistance to corrosion and weakening, low density, and very high porosity and permeability. Alternately, the substantially fibrous porous nonwoven refractory material 16 comprises ceramic fibers having toughened unipiece fibrous insulation (TUFI) and/or reaction cured glass (RCG) coatings, TEOS coatings, alumina-silica sol-gel coatings, cotronics coatings and other strengthening and/or thermally stabilizing and/or mechanically stabilizing coatings. The refractory fibers may be amorphous, vitreous, partially crystalline, crystalline or polycrystalline. Further, the substantially fibrous porous nonwoven refractory material 16 may include an opacifier for improving its thermal insulation properties, especially its insulation from the radiant transfer of heat.

Example substantially fibrous porous nonwoven refractory material 16 compositions include: (1) 70% silica fibers—28% alumina fibers—2% boron nitride; (2) 80% mullite fibers—20% bentonite clay; (3) 90% mullite fibers—10% kaolinite; (4) 100% aluminoborosilicate fibers (such as a homogenous mixture of 62% alumina—24% silica—14% boria); (5) AETB composition; (6) 90% aluminosilicate fibers—10% silica fibers (all compositions are expressed in weight percents); (7) 90% alumina fibers—10% clay; (8) 80% alumina fibers—20% colloidal silica. The compositions may be present as combinations of individual fibers (i.e., the 'mullite' of composition (2) may be present as alumina and silica fibers in a ration of four silica fibers for every alumina fiber) or as homogeneous fibers (i.e., composition 1 may be homogenous fibers of an aluminoborosilicate composition). Additionally, alumina, silica, zirconia, titania or the like may be added as sols, such as via dispersion, infiltration, dipping, or like techniques, to further densify the fibrous refractory material 16. The sol will convert to one or more stable ceramic material compositions (as a function of its composition) upon firing and will provide additional strength and structural support to the fibrous material 16 and may also act as a site for catalyst deposition. Alternately, the sol may contain clays that include silica, alumina, zirconia or the like. Clay-based binders such as bentonite, attapulgite, playgoprsite, montmorillonite, pyrophylite, kaolinite and the like may also be used in the forming process, added as dry mix or in a binder solution.

Figure 11A:
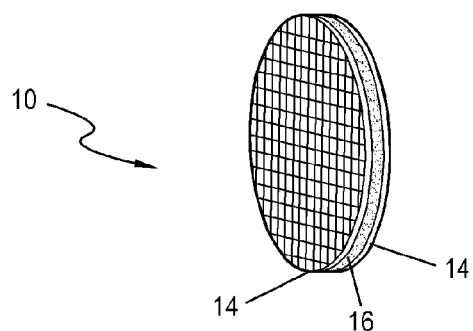
FIG. 11A is a diagram of a catalytic screen having a fibrous filter portion disposed between a pair of backbone support portions.
Figure 11B:
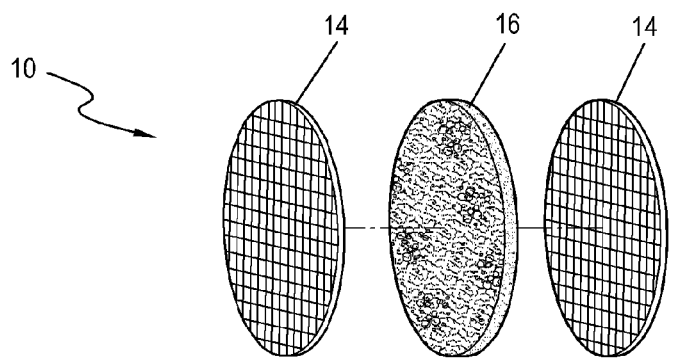
FIG. 11B is an exploded view of FIG. 11A.
Figure 11C:
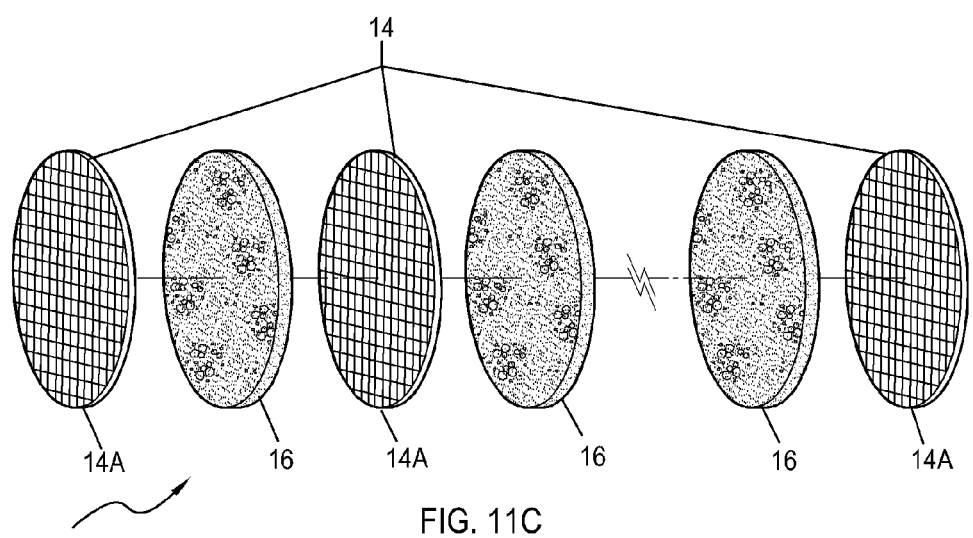
FIG. 11C is an exploded view of a catalytic screen having a fibrous filter portion disposed between a sequential pairs of backbone support portions.

In one embodiment, the screen 10 includes a substantially fibrous porous nonwoven refractory matrix 16 is formed between a pair of backbone members 14. (See FIGS. 11A and 11B). Alternately, the backbone 14 may be made up of a plurality of supporting members 14A with a plurality of substantially fibrous porous nonwoven refractory matrix 16 portions disposed between sequential pairs of structural support members 14A. (See FIG. 11C). While the substantially fibrous porous nonwoven refractory matrix 16 is still in a green state, the backbone members 14 with the substantially fibrous porous nonwoven refractory matrix 16 in between may be rolled or otherwise shaped as desired, and then dried and fired to preserve the desired shape. For convenience, the substantially fibrous porous nonwoven refractory matrix 16 may be first formed as a mat and then positioned between the pair of backbone members 14, or may be formed and positioned therebetween by any convenient technique, such as slipcasting, extrusion, or the like.

Figure 12A:
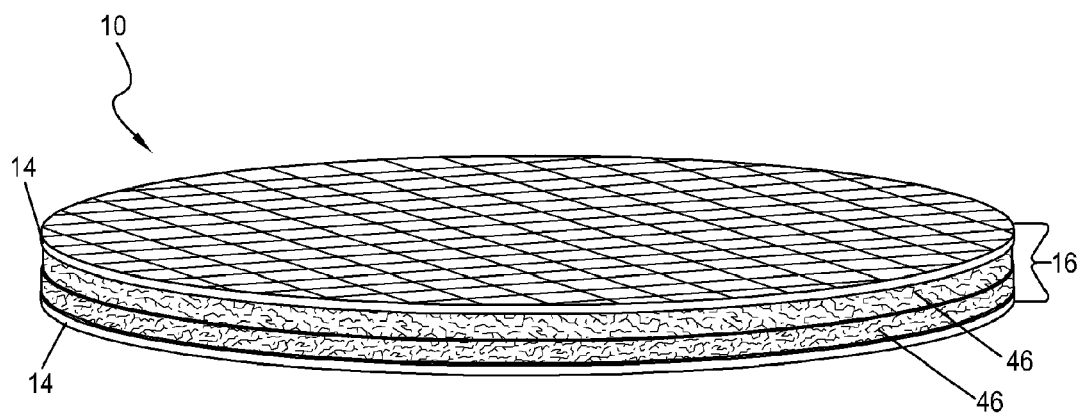
FIG. 12A is a diagram of a catalytic screen having a fibrous filter material formed with more than one discrete layer.
Figure 12B:
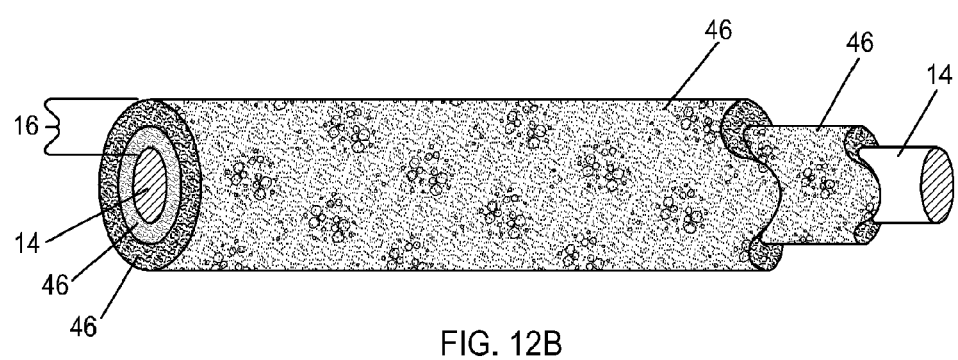
FIG. 12B is a diagram of a portion of backbone material having more than one discrete layer of filter material formed thereupon.

Further, the substantially fibrous porous nonwoven refractory matrix 16 may be formed on one or more backbone members in discrete layers 46 (see FIGS. 12A and 12B), which may be distinguished from one another by such characteristics as composition, density, porosity, or the like. For example, the substantially fibrous porous nonwoven refractory matrix 16 may consist of layers 46 of the same fibrous composition but with different densities (such as formed by slipcasting layers from slurries having increasingly higher concentrations of pore-formers). Likewise, the layers 46 may be of fibrous materials having different compositions (such as, for example, alumina fibers layered on aluminosilicate fibers, layered onto silica fibers). Further, the outermost layer 46 may be composed of a similar composition but formed from powder-based, not fibrous, precursors, and as such be harder, denser, and relatively non-porous.

The fibers form a substantially fibrous porous nonwoven refractory matrix 16 and are typically sintered or otherwise bonded together at their intersections. The substantially fibrous porous nonwoven refractory material 16 is typically at least about 60% porous, is more typically at least about 80% porous, and is still more typically at least about 90% porous. Alternately, the substantially fibrous porous nonwoven refractory material 16 may be coated onto the backbone 14 with a porosity gradient, such that the substantially fibrous porous nonwoven refractory material layer 16 is more porous (or less porous) adjacent the backbone 14 and less porous (or more porous) away from the backbone 14 (i.e., adjacent the exhaust pathway from the engine to the atmosphere 26). Likewise, the substantially fibrous porous nonwoven refractory material layer 16 may have a uniform and typically low density or, alternately, may have a density gradient such that it is denser adjacent the respective pathway component(s) 21 and less dense away from the respective pathway component(s) 21. This may be accomplished by varying the density and porosity of a single fibrous porous nonwoven refractory material layer 16 composition, or, alternately, by forming a fibrous porous nonwoven refractory material layer 16 from a plurality of sublayers, wherein each sublayer is characterized by fibers of different size, aspect ratio and/or density.

Typically, the substantially fibrous porous nonwoven refractory material 16 is selected such that its coefficient of thermal expansion (CTE) is similar to that of the backbone 14 to which it is to be connected. This CTE matching is desirable but not critical, since the substantially fibrous porous nonwoven refractory material 16 is fibrous and typically highly porous, such that there is some 'give' built into the material 16. In other words, compressive forces will first cause the material 16 to deform and not crack or fail.

The fibrous porous nonwoven refractory material layer 16 may be formed through a variety of means. For example, the substantially fibrous porous nonwoven refractory material layer 16 may be disposed upon the backbone 14 through such ceramic processing techniques as coating, spraying, dipping, injection molding, compression, cementation, sol-gel application, lamination, solid or liquid phase sintering, vacuum forming, or the like. Alternately, the substantially fibrous porous nonwoven refractory material 16 may be applied on a flat metal backbone 14, which is then perforated and either utilized as a substantially flat planar screen 10 or, alternately, rolled into a cylinder or donut shape for insertion into a pipe section 24. Still alternately, the fibrous layer 16 may be formed onto a backbone 14 made of like, but substantially densified, fibrous material.

Likewise, the substantially porous nonwoven refractory fibrous portion 16 may be formed to varying degrees of thickness. For example, the fibrous portion 16 may be formed as a thick, porous membrane and attached in situ to the backbone portion 14. Alternately, the fibrous portion 16 may be applied with sufficient thickness onto the backbone 14 so as to have more significant particulate capturing capability.

The fibrous porous nonwoven refractory material layer 16 typically includes a catalyst material 18 at least partially coated thereon, typically coating at least portions of the individual fibers. The catalyst material 18 is typically chosen from the noble metals, such as platinum, palladium, and rhodium (either alone or as alloys or combinations), and oxides thereof, but may also be selected from chromium, nickel, rhenium, ruthenium, silver, osmium, iridium, vanadium, gold, binary oxides of palladium and rate earth metals/ oxides (such as $Sm_4PdO_7$, $Nd_4PdO_7$, $Pr_4PdO_7$ and/or $La4 PdO_7$), certain perovskite-structured compositions, and the like. The catalyst 18 is typically a material that lowers the potential barrier for a pollutant to nonpollutant reaction (i.e., helping the reaction to occur faster and/or at lower temperatures). Since different catalysts 18 require different threshold temperatures to begin to function, the fibrous porous nonwoven refractory material layer 16 may include more than one catalyst material 18 coated thereupon (either in discrete regions or intermixed with one and other). For example, the fibrous porous nonwoven refractory material layer 16 may include a first catalyst material 18 that begins to function at a first, relatively low temperature and a second catalyst material 18 that activates at a second, higher temperature. The second material 18 may be added because it is cheaper, more chemically and/or thermally stable, has a higher top end temperature for catalyst function, and/or is a more efficient catalyst 18.

Typically, a washcoat layer, such as alumina, ceria, zirconia, titania or the like, is provided between the fibers and the catalyst material 18 to promote adhesion and to improve catalyst efficiency. Both the layer 16 thickness and degree of catalyst 18 coating on the fibers may be increased and/or decreased to tailor the temperature (i.e., the degree of thermal insulation provided) and catalytic activity (catalyst 18 is expensive, and thus it is desirable to not use more than is necessary for a given exhaust gas environment) of the exhaust system. The system 10 allows catalytic benefits coincident with temperature management to increase vehicle safety (such as by lowering exhaust system outer temperature), shorten light-off time, utilize otherwise wasted heat, and the like while simultaneously decreasing pollution emissions. The system 10 may be used in tandem with conventional and pre-existing pollution control methodology, or may be used alone to address pollution emissions from heretofore uncontrolled sources, such as lawn mowers. Since the screen 10 typically includes open exhaust channels 21, replacing conventional catalytic converters with one or more screens 10 reduces the complexity of the typical vehicular exhaust system (as well as its weight) and potentially simultaneously decreases the effective back pressure and cost as well.

The screen 10 may also capture particulate matter, such as via the porous nature of the fibrous material 16. In these cases, the catalyst material 18 may be utilized to facilitate oxidation of the particulate matter at relatively low temperatures. In exhaust streams with high concentrations of particulate matter, the fibrous layer 16 will be called upon to efficiently trap and store soot, ash, and other particulate matter contributions without significantly increasing exhaust stream back pressure. Further, the catalyst material 18 is typically selected to oxidize soot and ash as well as exhaust gasses; this may be accomplished via the judicious selection of a single catalyst material 18 or by selecting a combination of catalyst materials 18 matched to the various pollutants desired to be catalyzed. Since particulate filtration is typically a more depth-oriented process than non-particulate conversion, the catalyst 18 is typically applied not just on the surface of the fibrous layer 16 but also into the porosity extending away from the surface.

In operation, pollutant-containing exhaust gas from the engine 25 typically flows through the exhaust gas pathway 26, flows through the screen 10 positioned therein. The screen 10 acts to catalytically remove some of the pollutants from the gas flowing therethrough, such that less-polluted exhaust gas 27 then flows from the screen 10 to the atmosphere. Since the fibrous nonwoven refractory material layer 16 portion of the screen is typically substantially porous, diffusion forces urge the exhaust gas into the pores of the substantially fibrous porous nonwoven refractory material layer 16. The fibrous nonwoven refractory material layer 16 is typically thick enough to provide substantial surface area for significant exhaust gas 25 contact, but not so thick so as to significantly impeded the flow of exhaust fluids from the engine to the atmosphere and thus contribute to an unacceptable build-up of back pressure. Typically, the fibrous nonwoven refractory material layer 16 is between about 5 and about 10 millimeters thick, although the thickness may vary with exhaust system size, positioning in the pathway 10, and the like.

Typically, the exhaust gas 25 does not penetrate completely into the substantially fibrous porous nonwoven refractory material layer 16, since the diffusion forces are relatively weak as compared to the pressure differential between the engine and the atmospheres, thereby urging the cleaned exhaust gas 27 along and out of the pathway 10 and into the atmosphere. Also, the substantially fibrous porous nonwoven refractory material layer 14 tends to become denser and less porous moving from its inner surface (adjacent the exhaust gas) to its outer surface (adjacent the backbone 14 portion), so exhaust gas is less likely to fully penetrate.

Due to the typically very high surface area to volume ratio of the screen 10, the exhaust gas transfers heat into the substantially fibrous porous nonwoven refractory material layer 16, which tends to quickly raise the temperature of at least the inner surface of layer 16 until it is in equilibrium with the exhaust gas temperature, since the substantially fibrous porous nonwoven refractory material layer 16 typically has a low thermal conductivity value. If a catalyst 18 material is present thereon, its temperature is likewise quickly increased into its operating range, whereupon the catalyst material 18 begins to convert pollutants in the exhaust gas into relatively harmless nonpollutant gasses. If the screen 10 is located sufficiently close to the engine, the exhaust gasses will not have had time to significantly cool, and the screen 10 may thus be nearly instantaneously heated to its operating temperature. Furthermore, the screen 10 may be preheated, such as by a resistance heater or the flow of electricity therethrough (i.e., the backbone 14 and/or the fibrous material 16 is the resistance heater) so as to further shorten the light-off time.

The screen 10 may be used with any source of pollutant fluids, such as gasoline and diesel engines, including those in automobiles, motorcycles, lawn mowers, recreational equipment, power tools, chemical plants, and the like, to further reduce pollution emissions therefrom. Further, as mentioned above, the screen 10 provides an additional function of trapping particulate emissions in fibrous nonwoven refractory material layer 16 for later burnout or removal. The system may be present in the form of an insert into an existing exhaust system 16, as an add-on screen 10 having couplings or connectors 22 operationally connected at one or both ends (see FIG. 3B), as a tubular insert 10 into an existing exhaust system (see FIG. 6A), or as an exhaust system element 10 as originally installed. The system 10 is typically used in conjunction with other pollution reduction systems (such as in automobiles) to further reduce pollutant emissions, but may also be used alone where space is at a premium (such as in lawn mowers or the like).

Figure 3B:
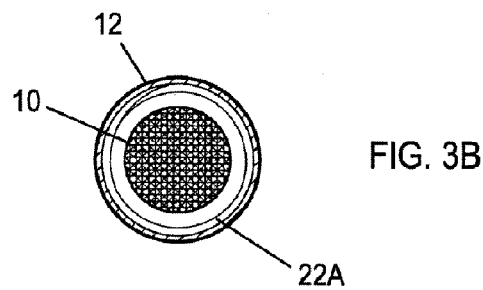

Referring now to FIGS. 3A and 3B, a first catalytic exhaust processing system or device 30 utilizing a substantially flat catalytic screen 10 is illustrated. The catalytic screen 10 may be sized and shaped for placement into the exhaust path 26 defined by the exhaust system 30, which may be that of a vehicular or other exhaust gas producing mechanism. In particular, the catalytic screen 10 is sized and installed into an exhaust conduit 24 (which may be any portion defining the exhaust pathway 26 extending from an engine, a residential or commercial oven, or any like exhaust gas source). It will be appreciated that catalytic screen 10 may take many sizes and shapes, depending on the dimensions of the exhaust conduit portion 24 and other relevant particular installation and application needs.

Generally, catalytic screen 10 has a mesh backbone support structure 14 on which substantially porous nonwoven fibrous refractory material 16 is disposed. Catalytic material 18 is likewise coated on the fibrous material 16. The catalyst material 18 composition is typically specifically selected to perform a particular catalytic function. Fibrous material 16 is typically disposed over the entire backbone structure 14, more typically including the areas 21 between the solid portions of the mesh 14. It will be appreciated that overall catalytic conversion efficiency and backpressure may be manipulated by adjusting the density of support mesh 14 (i.e., the solid area to aperture area ratio), porosity and thickness of the fibrous material 16, and the amount of catalytic material 18 used.

FIGS. 3A and 3B show the catalytic screen 10 as installed in an exhaust system 30. The screen 10 is installed in housing 12, which is coupled between exhaust pipe sections 24. Housing 12 typically includes couplers 22A (herein illustrated and described as threads, although the couplers 22A may be any convenient coupling mechanism, such as protrusions, tabs, indents, or other coupling structures) to facilitate removable attachment and mating with couplers 22B formed in the exhaust conduit sections 24. Typically, the couplers 22A formed in the housing 12 are threads and are matably connectable to the threads 22B formed in the exhaust gas conduit 24; thus, the catalytic screen 10 is typically readily accessible and removable for ease of replacement.

Figure 4A:
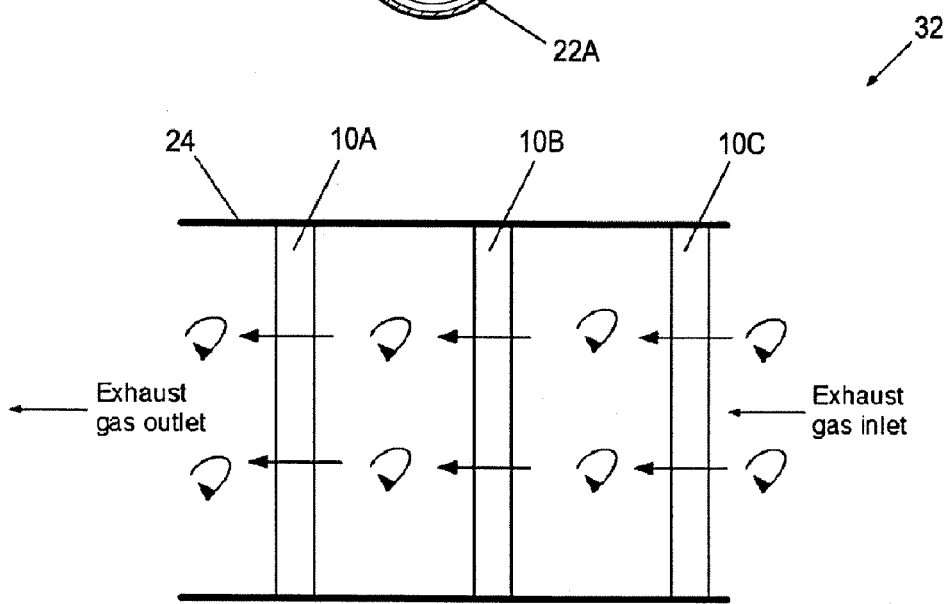
FIG. 4 is a diagram of a multiple catalytic screen system in accordance with the present invention.
Figure 4B:
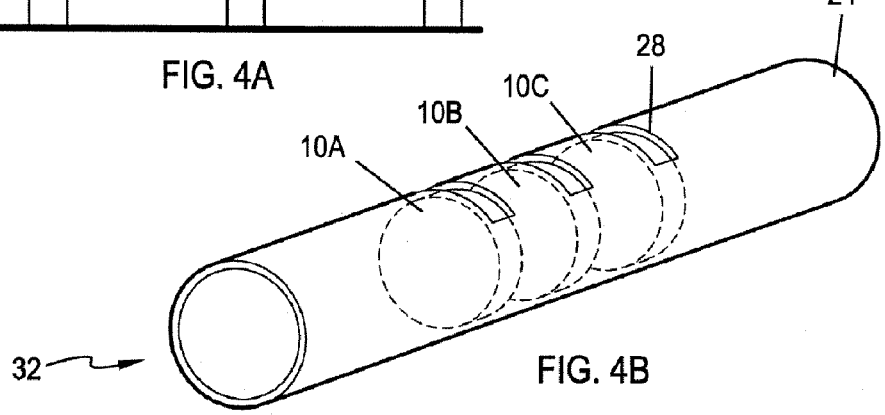

FIGS. 4A and 4B show a catalytic screen assembly 32 having a plurality of different catalytic screens 10A, 10B, 10C and positioned in series in a conduit 24. While three screens 10 are illustrated with regard to assembly 32, any number of screens 10 may be selected. In this embodiment, the screens 10A, 10B, 10C are inserted into the conduit 24 through slots 28 formed through the conduit exterior; alternately, the screens 10A, 10B, 10C may be positioned in the conduit 24 by any convenient means. Each respective screen 10 may have a difference catalyst composition 18 on its respective fibrous material 16 so as to catalyze the conversion of a different respective pollutant to nonpollutant products, or the respective catalyst compositions 18 may have different activation temperatures for a wider range of effective operation. The catalytic screens 10A, 10B, 10C may also be characterized by different porosities to better facilitate particulate removal. Moreover, one or more of the respective screens 10A, 10B, 10C may be electrically charged so as to actively attract ionic particulate pollutants in the exhaust gas stream (the charge on the screen 10 is thus selected to be opposite in sign of the charge characteristic of the airborne particulates desired to be removed).

Figure 5A:
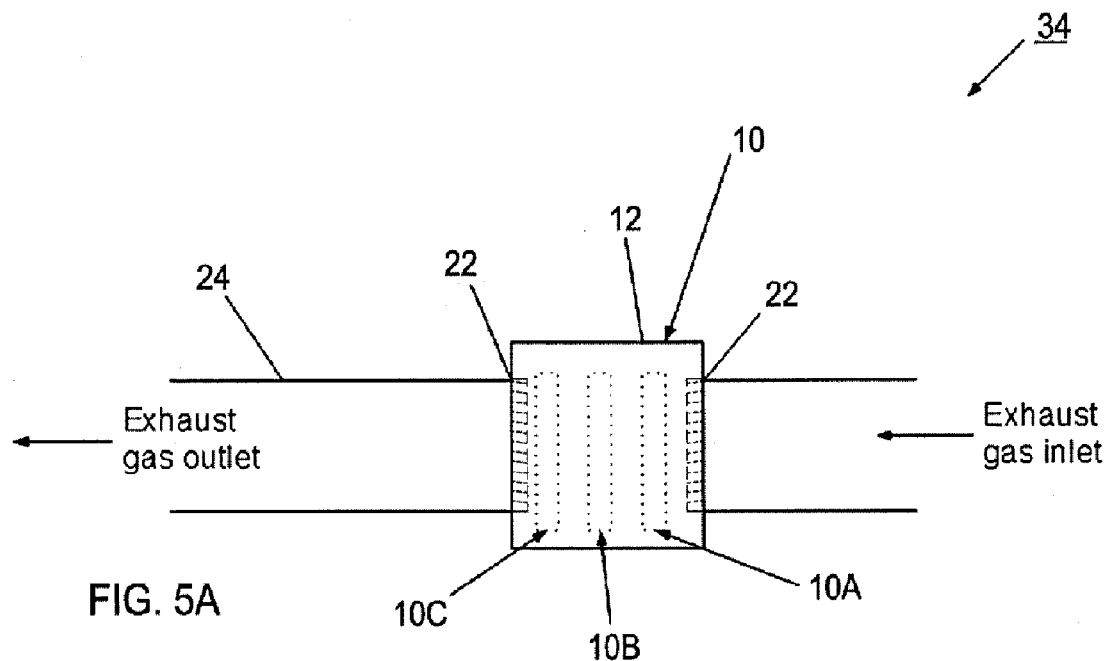
FIG. 5 is a diagram of an installed multiple catalytic screen system in accordance with the present invention.
Figure 5B:
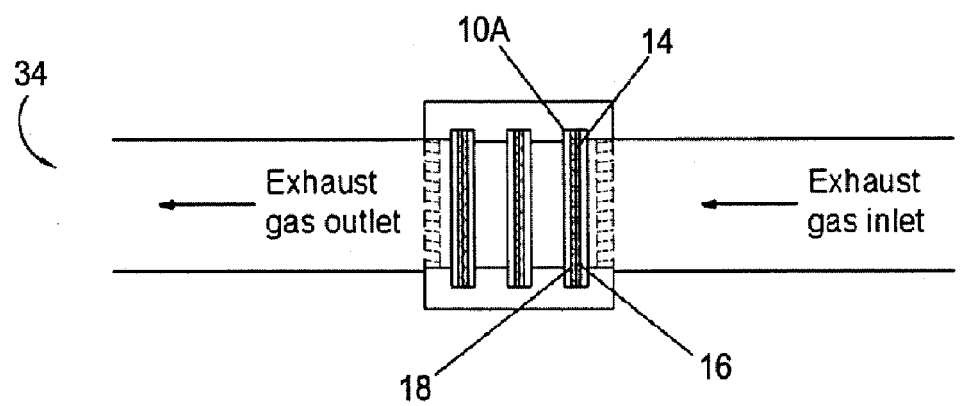

FIGS. 5A and 5B more particularly show the multiple catalytic screen assembly 32 as installed in an exhaust gas processing system 34. The screens 10A, 10B, 10C are installed in housing 12, which is fluidically coupled to exhaust pipe 24. Housing 12 may include threads, protrusions, tabs, indents, or other coupling structures 22 to facilitate attachment and mating with exhaust pipe 24. Catalytic screen assembly 32 may be removable for ease of replacement.

Figure 6A:
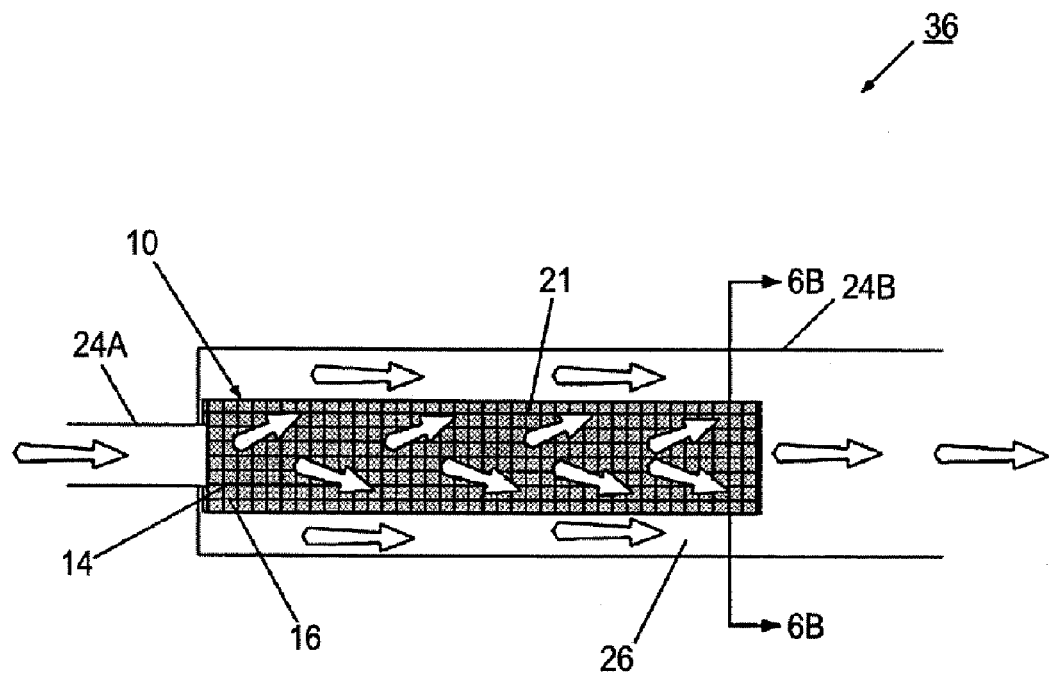
FIG. 6 is a diagram of a catalytic tube in accordance with the present invention.
Figure 6B:
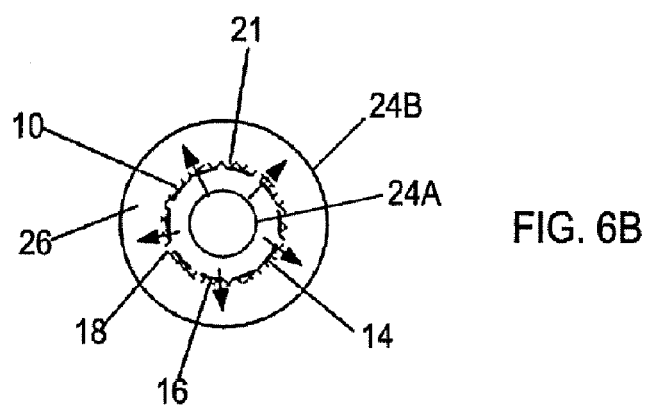
Figure 6C:
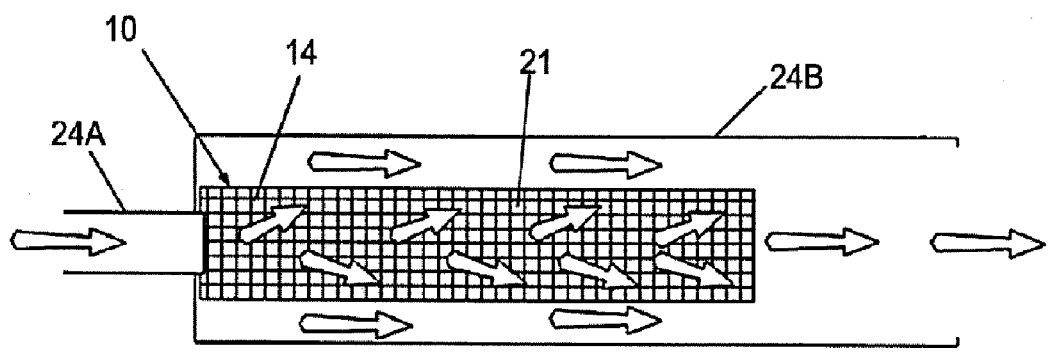

FIGS. 6A-6C show the catalytic screen 10 curved into the shape of a tube or hollow cylinder and fluidically connected as part of a tube-in-tube style exhaust gas processing system 26. Inner tubular screen 10 has a cylindrical screen/mesh backbone 14, which is coated with fibrous material 16 and overlaid with catalytic material 18. Exhaust gas enters inner tubular screen 10 from inlet conduit portion 24A. The gas is forced through exhaust channels 21 along the exhaust pathway 26. The exhaust path 26 thus extends from the exhaust gas source, through inlet pipe 24, through inner tubular screen 10, to outer tube 24B and from there on to the atmosphere.

Figure 7A:
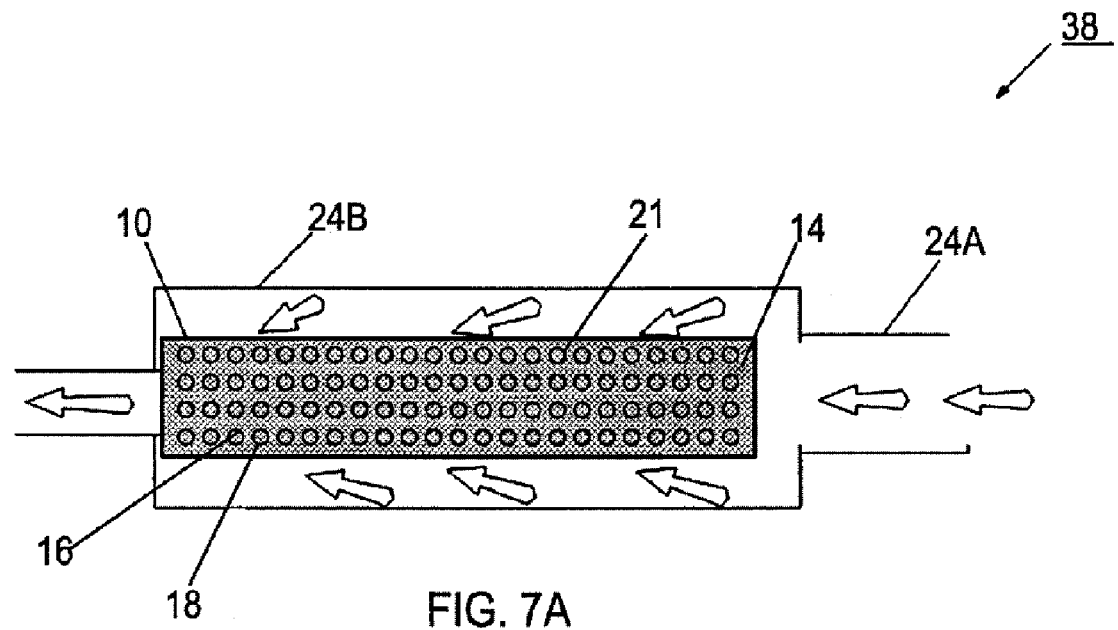
FIG. 7 is a diagram of a catalytic tube in accordance with the present invention.
Figure 7B:
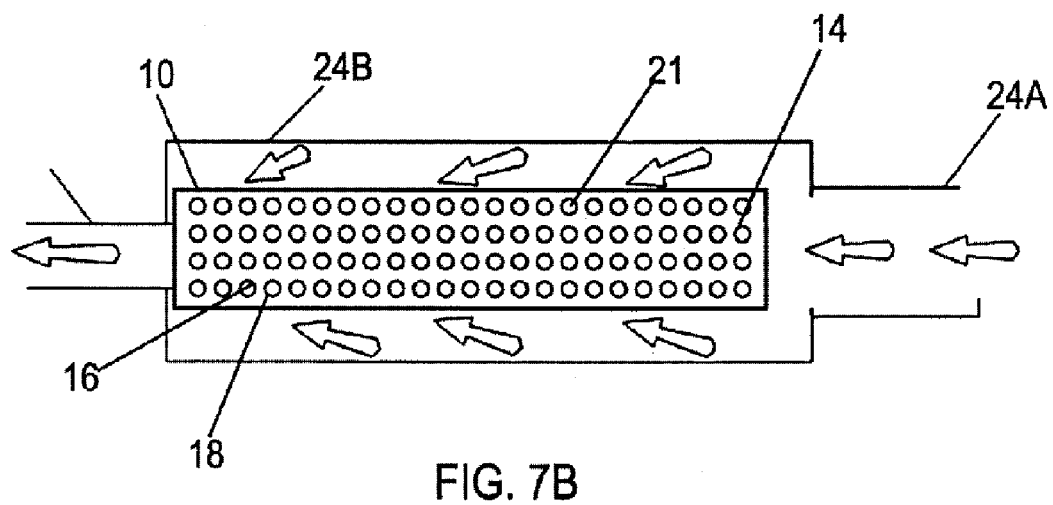

FIG. 7 shows an exhaust gas treatment device 38 in the form of an alternate tube-in-tube arrangement. Inner tubular screen 10 has a perforated-sheet backbone 14, which is coated with fibrous material 16 and catalytic material 18. Exhaust gas enters outer conduit 24B from inlet conduit 24A, and the exhaust gas is forced through exhaust channels 21 into the inner tubular screen 10. The exhaust path 26 is thus from inlet tube 24A, through outer tube 24B and into inner tubular screen 10, and from there on to the atmosphere.

Figure 8:
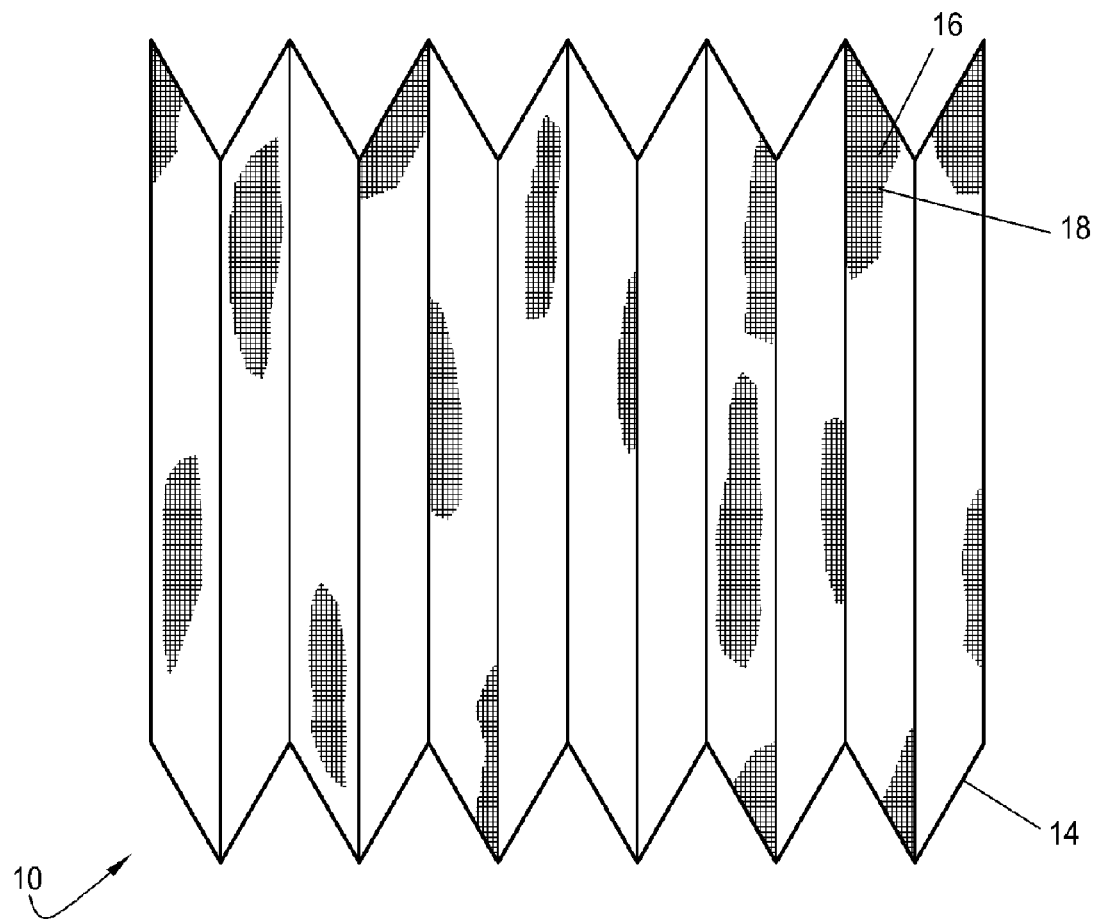
FIG. 8 is a diagram of a pleated catalytic screen in accordance with the present invention.

FIG. 8 illustrates another form of the screen 10, wherein the backbone 14 is formed of a screen, mesh, or perforated sheet that has been pleated to increase its effective cross-sectional surface area. The backbone 14 is typically coated with fibrous material 16 and catalyst 18 layers prior to being pleated, but may alternately be so coated after the pleating process.

Figure 9:
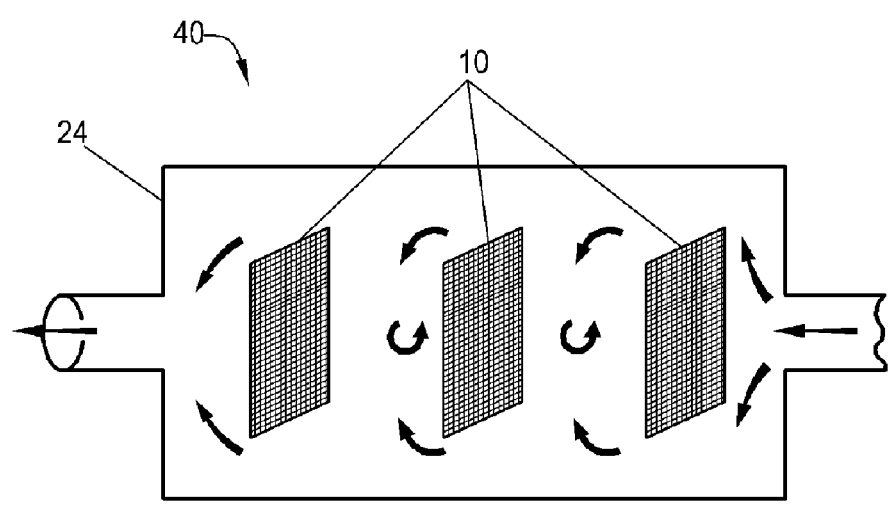
FIG. 9 is a diagram of a muffler-installed multiple catalytic screen/baffle system in accordance with the present invention.

FIG. 9 illustrates a plurality of screens 10 positioned in a conduit portion 24 configured as a muffler 40 to serve the dual function of making the flow of exhaust gasses therethrough more turbulent and to simultaneously remove pollutants from the flowing exhaust gasses. In other words, the screens 10 are positioned as exhaust baffles that also purify the exhaust gasses. While FIG. 9 illustrates the screens 10 as positioned to baffle the exhaust gas flow in a muffler 40, the screens may also be positioned to provide a similar function anywhere in the exhaust pathway 26.

Figure 10A:
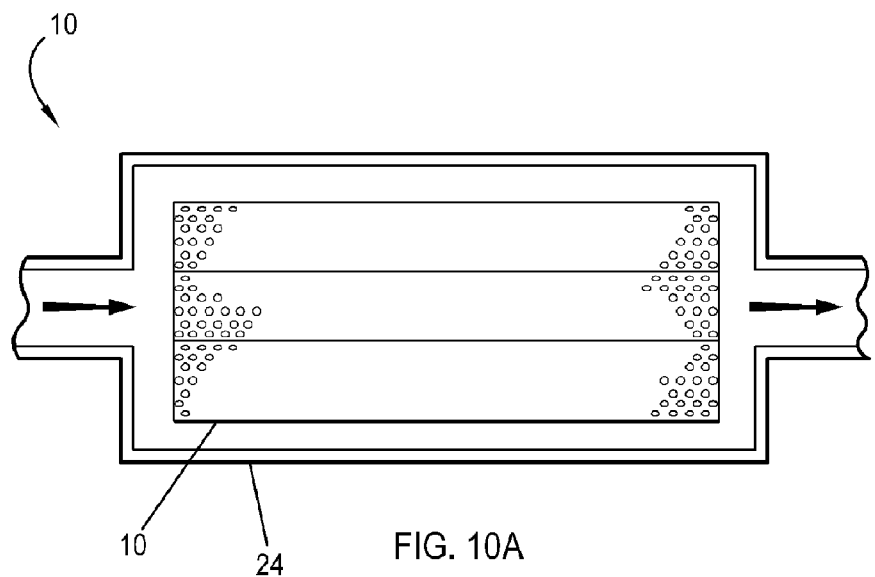
FIG. 10A is a diagram of an exhaust system conduit portion having a plurality of tubular catalytic screens positioned therein.
Figure 10B:
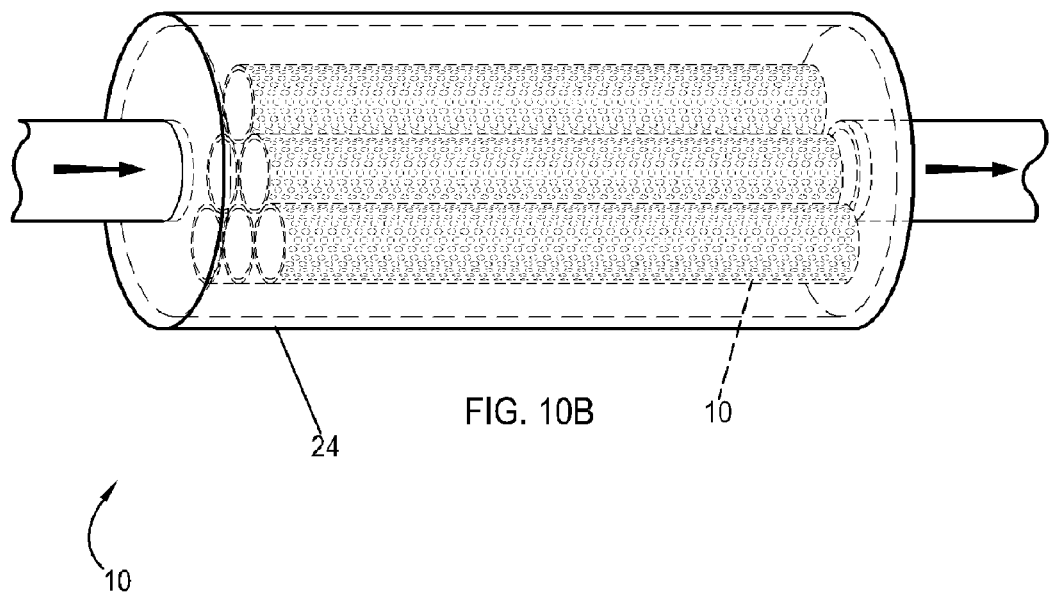
FIG. 10B is a perspective view of the system of FIG. 10A.

In yet another alternate configuration, as illustrated in FIG. 10, a first portion of the screen 10 may be coated with a first catalyst material 18 (such as an oxidation catalyst) and a second portion of the screen 10 may be coated with a second catalyst material 18 (such as a reduction catalyst). Typically, the screen 10 is curved to form a hollow cylinder or tube. More typically, a plurality of tubular screens 10 are supplied, and still more typically the tubular screens 10 are bundled and stacked (such as in a barrel formation) to increase the effective reactivity and conversion efficiency of the screens 10. Yet more typically, the substantially fibrous nonwoven layers 16 are sufficiently thick as to contact one another, substantially filling the exhaust path 26 through the backbone 14 and thus forcing the exhaust gas to pass through the substantially fibrous nonwoven material 16 for filtration and gas conversion.

While the preceding examples relate generally to screen devices 10 for the removal of pollutants (both gaseous and particulate) from exhaust gas streams, and more specifically to screen filters 10 for use with internal combustion engines, the screens 10 may also be used in a variety of other applications wherein fluids are desired to be treated or processed. For example, a screen 10 may be useful in low temperature catalytic air filtration applications (such as in vehicular cabin air conditioning/heating applications). Moreover, various fluids may be filtered through a screen 10, including liquids, emulsions, suspensions, potable fluids (such as beer, beer flavorants, wine, juice, water, milk and whey) laboratory grade water, wastewater, pharmaceuticals, medicines, and cosmetics. The screens 10 may be generally useful in the fields of chemistry, biotechnology, gene technology, environmental protection and in general laboratory work. Filters 10 may be utilized in cross-flow and other filtration units for the recovery of valuable material, for the separation of substances such as macromolecules and biomolecules, for the depyrogenation and sterilization of solutions, for the separation of corrosive substances from fluids, for the filtration and concentration of biological solutions, for the separation of microorganisms such as bacteria, yeasts, virus and cell components, for the desalination of protein solutions and other biological media, nano-materials, precious metals, catalysts, hot metals, and the like. By means of example, filters 10 may be utilized in such endeavors as Fischer-Tropsch synthesis, catalytic cracking and reforming, isomerization, fuel-cells technology, molecular sieves, shape selective reactions, biosynthetic reactions such as growth and repair of tissues, ozone abatement in high flying aircraft, nitrous oxide decomposition, low-temperature oxidation, and the like.

In an alternate embodiment, the screen 10 is incorporated into an emissions control system where active regeneration is employed. The temperature of the screen 10 is raised in a controlled fashion using techniques known in the art (such as by the injection of excess unburnt fuel into the exhaust stream, via electrical or microwave heaters, through pressure buildup, or the like) until soot caught in the screen 10 ignites and is substantially completely burnt off. The system could also contain control systems that would allow the onboard diagnostics computer to conduct thermal management of the exhaust system.

Another use for the screen 10 is as a component of a cross-flow filter. Cross flow filters utilize the preferential attraction or filtration potential of a porous material to separate two fluids (such as separating oil from air or water) or condensed matter (e.g. particulates) from a fluid stream. In a typical cross-flow filter, the inlet channels and the outlet channels run perpendicular to each other, and typically lie on a different plan from each other. The inlet and the outlet channels may contain blocks that would prevent easy flow of material in the channels. The walls of the cross-flow filter could be coated with a reactive agent 18, such as a membrane, chemical coating, or a catalyst coating. The role of the reactive agent 18 is to have a particular attraction/affinity for certain molecules or material and not for others. For example, a pore-specific membrane may allow smaller molecules to pass through the membrane but not larger molecules, thereby separating smaller molecules from larger molecules. In such an example, a mixture of small and large molecules could enter in a fluid stream into the inlet channels and as the fluid flows in the inlet channel, and over the separation membrane, the small molecules may diffuse into the membrane and emerge into the outlet channel where they could flow perpendicular to the inlet flow and be extracted at the outlet channels. The larger molecules will continue to flow down the inlet channels and exit at the other end. The entire system, in this manner, works to separate one set of species from other species.

The reactive agents 18 could contain chemically active components or materials that have attraction to hydrophilic or hydrophobic molecules. Similarly, the reactive agent could wholly or only partially cover the walls. The reactive agent 18 could exist only on the surface of the wall or be embedded throughout the wall thickness. The reactive agent 18 could be layered such that each layer contains a different composition or the same composition but in different concentrations. The cross-flow filters are efficient filters, which work to continuously separate fluids or particulates from fluids. Once the crow-flow filters are packed or clogged, they can either be cleaned or replaced in the filtration system.

Substantially fibrous nonwoven gas permeable materials 16 offer great advantages to cross-flow filtration. Such substrates may be readily formed into desired shapes and forms, have very high porosities and/or permeabilities, offer easy control of pore-size, contribute relatively little backpressure, have a high filtration capacity, are typically suitable for hosting a number of reactive agents 18, are characterized by chemical stability, and are typically refractory. Moreover, the open fibrous network reduces or minimizes the likelihood of clogging the system during filtration or separation are very low, thereby prolonging the time required before replacement or cleanup.

While the invention has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the invention are desired to be protected.

What is claimed is:

1. A vehicle comprising an exhaust gas treatment system, comprising:
    an internal combustion engine defining an exhaust source;
    a first fluid conduit portion;
    a second fluid conduit portion;
    a gas permeable backbone member fluidically connected between the first and second conduit portions; and
    a substantially fibrous nonwoven refractory material disposed on the backbone.

2. The vehicle of claim 1, wherein a catalytic material is disposed on at least some of the substantially fibrous nonwoven refractory material.

3. The vehicle according to claim 1, wherein the first fluid conduit portion is positioned inside the second fluid conduit portion and wherein the gas permeable backbone member is formed as part of the first fluid conduit portion.

4. The vehicle of claim 1, wherein the substantially fibrous nonwoven refractory material is a fluid filter.

5. The vehicle of claim 1 wherein the gas permeable backbone member is a hollow tube.

6. The vehicle of claim 1 wherein the gas permeable backbone member is a plurality of hollow tubes.

7. The vehicle of claim 1 wherein the gas permeable backbone member includes a first supporting member and a second supporting member; wherein the substantially fibrous nonwoven refractory material is disposed between the first supporting member and the second supporting member; and wherein the substantially fibrous nonwoven refractory material is connected to both the first and the second supporting members.

8. The vehicle of claim 1 wherein the substantially fibrous nonwoven refractory material includes a first layer and a second layer.

9. The vehicle of claim 8 wherein the first layer has a different fibrous composition than the second layer.

10. The vehicle of claim 8 wherein the first layer has a different density than the second layer.

11. A method for manufacturing a vehicle having an internal combustion engine, comprising:
   a) providing a vehicle having an internal combustion engine;
   b) defining an exhaust path extending between the internal combustion engine and the atmosphere; and
   c) placing an exhaust gas pollution treatment device in the exhaust path;

wherein the exhaust gas pollution treatment device further comprises:
   a gas permeable backbone member positioned in the exhaust path; and
   a substantially fibrous nonwoven refractory material disposed on the backbone.

12. The method of claim 11 wherein a catalytic material is disposed on at least some of the substantially fibrous nonwoven refractory material.

13. The method of claim 11 wherein the gas permeable backbone member is a screen positioned to substantially intersect the exhaust path.

14. The method of claim 11 wherein the gas permeable backbone member is a plurality of screens positioned to substantially intersect the exhaust path.

15. The method of claim 11 wherein the gas permeable backbone member is a hollow tube.

16. The method of claim 11 wherein the gas permeable backbone member is a plurality of hollow tubes.

17. The method of claim 11 wherein the substantially fibrous nonwoven refractory material includes a first layer and a second layer.

18. The method of claim 17 wherein the first layer has a different fibrous composition than the second layer.

19. The method of claim 17 wherein the first layer has a different density than the second layer.

20. The method of claim 11 wherein the vehicle is a motorcycle.

\* \* \* \* \*